US012700112B2

(12) United States Patent
      Kobach

(10) Patent No.: US 12,700,112 B2
(45) Date of Patent: Aug. 4, 2026

(54) CONVERSION OF COMPUTER VISION DATA INTO MEASUREMENTS FOR IN-VEHICLE ADVANCED DRIVER ASSISTANCE SYSTEM (ADAS) OR OTHER SYSTEM

(71) Applicant: Omnitracs, LLC, Westlake, TX (US)

(72) Inventor: Andrew C. Kobach, San Diego, CA (US)

(73) Assignee: Omnitracs, LLC, Westlake, TX (US)

( * ) Notice: Subject to any disclaimer, the term of this patent is extended or adjusted under 35 U.S.C. 154(b) by 505 days.

(21) Appl. No.: 18/308,461

(22) Filed: Apr. 27, 2023

(65) Prior Publication Data

US 2024/0362803 A1     Oct. 31, 2024

(51) Int. Cl.
      *G06T 7/50*      (2017.01)
      *B60W 30/12*     (2020.01)
      *B60W 30/16*     (2020.01)
      *G06T 7/70*      (2017.01)
      *G06V 20/56*     (2022.01)
      *G06V 20/58*     (2022.01)

(52) U.S. Cl.
      CPC .............. *G06T 7/50* (2017.01); *B60W 30/12* (2013.01); *B60W 30/16* (2013.01); *G06T 7/70* (2017.01); *G06V 20/58* (2022.01); *G06V 20/588* (2022.01)

(58) Field of Classification Search
      CPC ... G06T 7/50; G06T 7/70; G06T 2207/30256; G06T 7/73; G06T 7/80; B60W 30/12; B60W 30/16; G06V 20/58; G06V 20/588
      See application file for complete search history.

(56) References Cited

U.S. PATENT DOCUMENTS

| | | |
|---|---|---|
| 11,080,544 B1 | 8/2021 | Kim et al. |
| 2010/0321490 A1 | 12/2010 | Chen et al. |
| 2011/0115912 A1 | 5/2011 | Kuehnle |
| 2014/0063251 A1* | 3/2014 | Kim ..................... G08G 1/0967 |
| | | 348/148 |
| 2015/0161456 A1 | 6/2015 | Chevalley |
| 2017/0001566 A1 | 1/2017 | Lu et al. |

(Continued)

OTHER PUBLICATIONS

Partial European Search Report dated Oct. 4, 2024 in connection with European Patent Application No. 24172316.2, 18 pages.

(Continued)

*Primary Examiner* — Ming Y Hon
*Assistant Examiner* — Amanda H Pearson

(57)                ABSTRACT

A method includes obtaining an image of a scene using an imaging sensor on a vehicle, where the image captures at least one of: one or more objects around the vehicle or one or more lane marking lines. The method also includes identifying extrinsic calibration parameters associated with the imaging sensor. The method further includes, for a specified pixel in the image, converting a position of the specified pixel within a pixel coordinate system associated with the image to a corresponding position within a road coordinate system based on the extrinsic calibration parameters. The specified pixel represents a point in the image associated with at least one of the one or more objects or the one or more lane marking lines. In addition, the method includes identifying a distance to the point in the image based on the corresponding position of the specified pixel within the road coordinate system.

26 Claims, 7 Drawing Sheets

(56) References Cited

U.S. PATENT DOCUMENTS

| | | |
|---|---|---|
| 2021/0387637 A1 | 12/2021 | Rogers et al. |
| 2021/0398310 A1 | 12/2021 | Ge et al. |
| 2023/0136214 A1 | 5/2023 | Kobach et al. |
| 2023/0138686 A1* | 5/2023 | Shaag ........................ G06T 7/80 701/301 |
| 2023/0177724 A1* | 6/2023 | Naveh ........................ G06T 7/80 382/103 |

OTHER PUBLICATIONS

Nienaber et al., "A Comparison of Low-Cost Monocular Vision Techniques for Pothole Distance Estimation", IEEE Symposium Series on Computational Intelligence, 2015, 8 pages.
Liu et al., "Motion Constraints and Vanishing Point Aided Land Vehicle Navigation", Micromachines, May 2018, 24 pages.
International Search Report and Written Opinion of the International Searching Authority dated Nov. 16, 2022 in connection with International Patent Application No. PCT/US2022/074976, 13 pages.
Orghidan et al., "Camera calibration using two or three vanishing points", Proceedings of the Federated Conference on Computer Science and Information Systems, 2012, 8 pages.
Liu et al., "D-VPnet: A Network for Real-time Dominant Vanishing Point Detection in Natural Scenes", Jun. 2020, 18 pages.
Yuan et al., "Robust Lane Detection for Complicated Road Environment Based on Normal Map", Sep. 2018, 11 pages.
"Camera Calibration Settings (Automatic Vanishing Point)—Samsara Support", Jun. 2021, 5 pages.
"Extrinsic Camera Calibration—Algorithms for Automated Driving", https://thomasfermi.github.io, Sep. 2021, 11 pages.
Guillou et al., "Using Vanishing Points for Camera Calibration and Coarse 3D Reconstruction from a Single Image", The Visual Computer, Nov. 2000, 16 pages.
Caprile et al., "Using Vanishing Points for Camera Calibration", International Journal of Computer Vision, 1990, 13 pages.
Supplementary European Search Report dated Dec. 10, 2024 in connection with European Patent Application No. 24172316.2, 23 pages.
Sivaraman et al., "Integrated Lane and Vehicle Detection, Localization, and Tracking: A Synergistic Approach," IEEE Transactions on Intelligent Transportation Systems, Jun. 2013, 12 pages.
Agren, "Lateral Position Detection Using a Vehicle-Mounted Camera," Master's Thesis Project in Computer Vision, 2003, 74 pages.

* cited by examiner

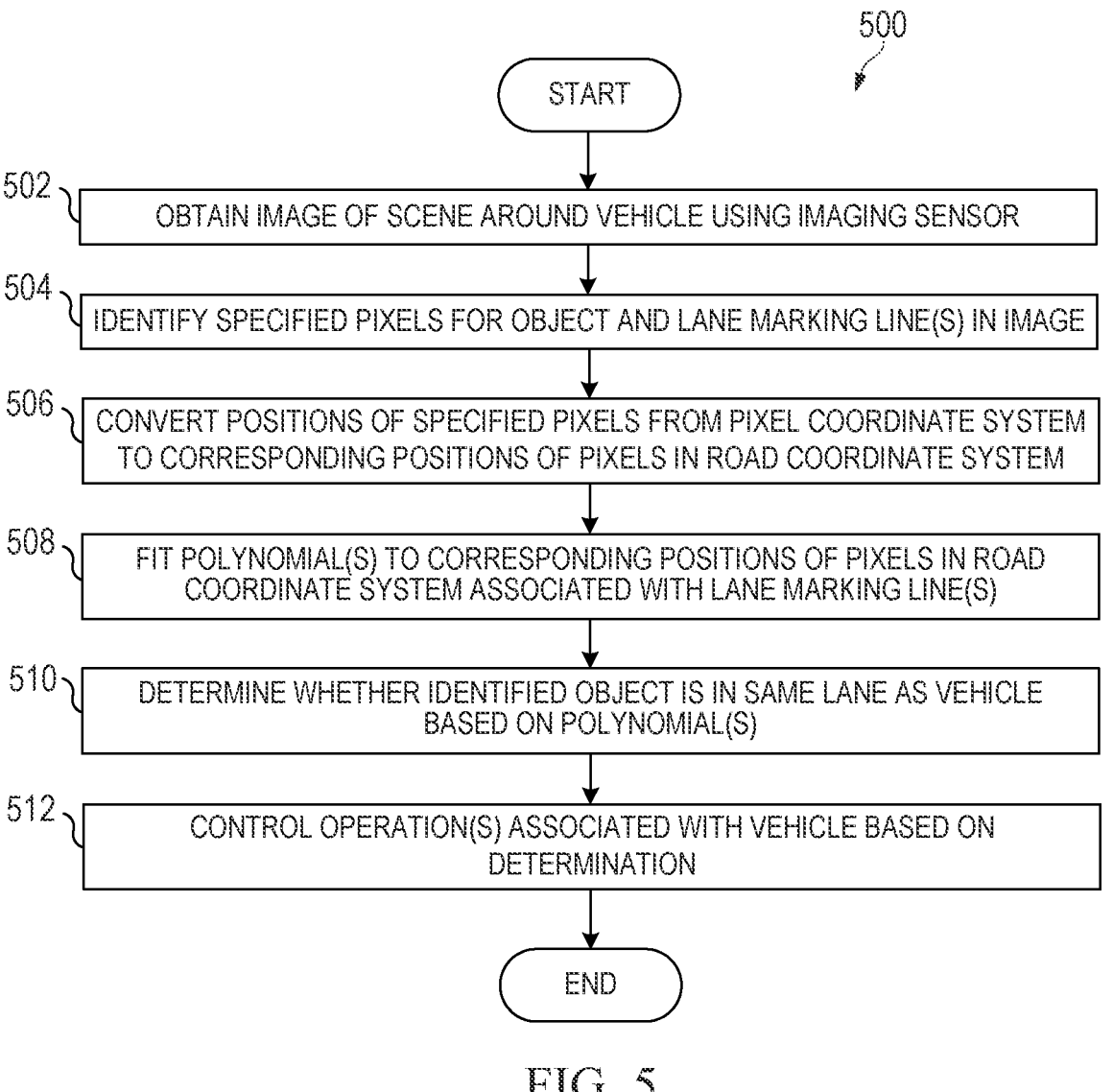

500

START

502 — OBTAIN IMAGE OF SCENE AROUND VEHICLE USING IMAGING SENSOR

504 — IDENTIFY SPECIFIED PIXELS FOR OBJECT AND LANE MARKING LINE(S) IN IMAGE

506 — CONVERT POSITIONS OF SPECIFIED PIXELS FROM PIXEL COORDINATE SYSTEM TO CORRESPONDING POSITIONS OF PIXELS IN ROAD COORDINATE SYSTEM

508 — FIT POLYNOMIAL(S) TO CORRESPONDING POSITIONS OF PIXELS IN ROAD COORDINATE SYSTEM ASSOCIATED WITH LANE MARKING LINE(S)

510 — DETERMINE WHETHER IDENTIFIED OBJECT IS IN SAME LANE AS VEHICLE BASED ON POLYNOMIAL(S)

512 — CONTROL OPERATION(S) ASSOCIATED WITH VEHICLE BASED ON DETERMINATION

END

FIG. 5

CONVERSION OF COMPUTER VISION DATA INTO MEASUREMENTS FOR IN-VEHICLE ADVANCED DRIVER ASSISTANCE SYSTEM (ADAS) OR OTHER SYSTEM

TECHNICAL FIELD

This disclosure generally relates to computer vision systems. More specifically, this disclosure relates to the conversion of computer vision data into measurements for an in-vehicle advanced driver assistance system (ADAS) or other system.

BACKGROUND

Advanced driver assistance system (ADAS) features are being incorporated into more and more vehicles over time. ADAS systems generally support features implemented using various technologies that assist drivers in performing driving and parking functions. Among other things, ADAS systems often use cameras or other imaging sensors to capture images and identify information related to vehicles during travel. For example, ADAS systems can process images captured by imaging sensors on vehicles in order to identify lane marking lines associated with traffic lanes in which the vehicles are traveling and to identify other nearby vehicles.

SUMMARY

This disclosure relates to the conversion of computer vision data into measurements for an in-vehicle advanced driver assistance system (ADAS) or other system.

In a first embodiment, a method includes obtaining an image of a scene using an imaging sensor on a vehicle, where the image captures at least one of: one or more objects around the vehicle or one or more lane marking lines. The method also includes identifying extrinsic calibration parameters associated with the imaging sensor. The method further includes, for a specified pixel in the image, converting a position of the specified pixel within a pixel coordinate system associated with the image to a corresponding position within a road coordinate system based on the extrinsic calibration parameters. The specified pixel represents a point in the image associated with at least one of the one or more objects or the one or more lane marking lines. In addition, the method includes identifying a distance to the point in the image based on the corresponding position of the specified pixel within the road coordinate system.

In a second embodiment, a method includes obtaining an image of a scene using an imaging sensor on a vehicle, where the image captures an object and one or more lane marking lines. The method also includes converting positions of multiple pixels within a pixel coordinate system associated with the image to multiple corresponding positions within a road coordinate system. The multiple pixels are associated with the object and the one or more lane marking lines. The method further includes fitting at least one polynomial to the corresponding positions within the road coordinate system associated with the one or more lane marking lines. Each polynomial identifies a path of one of the one or more lane marking lines. In addition, the method includes determining whether the object is located within a lane in which the vehicle is traveling, where the lane is at least partially defined by the at least one polynomial.

In a third embodiment, a method includes obtaining an image of a scene using an imaging sensor on a vehicle, where the image captures one or more lane marking lines. The method also includes converting positions of multiple pixels within a pixel coordinate system associated with the image to multiple corresponding positions within a road coordinate system. The multiple pixels are associated with the one or more lane marking lines. The method further includes fitting at least one polynomial to the corresponding positions within the road coordinate system associated with the one or more lane marking lines. Each polynomial identifies a path of one of the one or more lane marking lines. The method also includes extrapolating a path of a non-visible portion of each of the one or more lane marking lines based on the at least one polynomial. In addition, the method includes estimating a lateral distance of the vehicle to the path of the non-visible portion of each of the one or more lane marking lines.

In other embodiments, an apparatus includes at least one processing device configured to perform the method of one, some, or all of the first, second, and third embodiments. In still other embodiments, a non-transitory machine-readable medium contains instructions that when executed cause at least one processor to perform the method of one, some, or all of the first, second, and third embodiments.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which like reference numerals represent like parts:

FIG. 5 illustrates an example method for lane object detection according to this disclosure;

DETAILED DESCRIPTION

Figure 1:
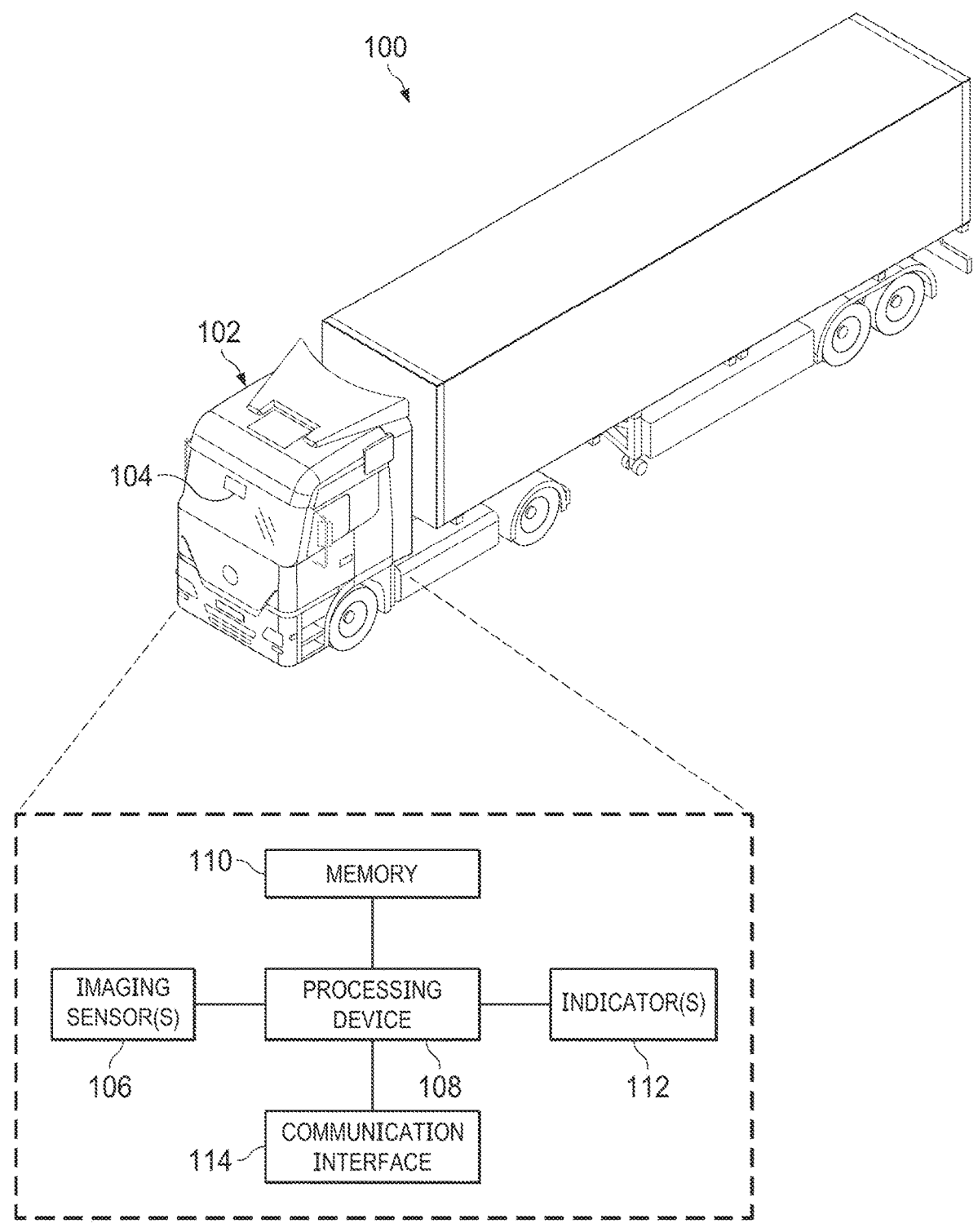
FIG. 1 illustrates an example system supporting the conversion of computer vision data into measurements for an in-vehicle advanced driver assistance system (ADAS) or other system according to this disclosure.

FIGS. 1 through 7, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, advanced driver assistance system (ADAS) features are being incorporated into more and more vehicles over time. ADAS systems generally support features implemented using various technologies that assist drivers in performing driving and parking functions. Among other things, ADAS systems often use cameras or other imaging sensors to capture images and identify information related to vehicles during travel. For example, ADAS systems can process images captured by imaging sensors on vehicles in order to identify lane marking lines associated with traffic lanes in which the vehicles are traveling and to identify other nearby vehicles.

The identification of locations of objects like lane marking lines and other vehicles relative to a monitored vehicle can be used for various purposes. For example, an ADAS or other system can be designed to trigger an audible or other warning if a monitored vehicle appears to be straying from its current traffic lane while a turn signal indicator (blinker) of the monitored vehicle is not activated, if the monitored vehicle is following another vehicle too closely, or if the monitored vehicle is approaching another vehicle too quickly. In some cases, this type of information or other information obtained by processing images associated with a monitored vehicle may be used to generate an estimated measure of the attentiveness or inattentiveness, aggressiveness, or other characteristic(s) of a monitored vehicle's driver. Unfortunately, accurately identifying locations of objects like lane marking lines and other vehicles relative to a monitored vehicle can be difficult. As a result, the identified locations of the objects may often suffer from large errors, which can lead to poor user experiences or other problems. For instance, audible or other warnings may be triggered even when a monitored vehicle is not straying from its current traffic lane, is not following another vehicle too closely, and is not approaching another vehicle too quickly.

This disclosure provides techniques for converting computer vision data into measurements for an in-vehicle ADAS or other system. As described in more detail below, an image of a scene can be obtained using an imaging sensor on a vehicle, such as a front-facing camera on the vehicle. The image can capture one or more objects around the vehicle, one or more lane marking lines, or both. Extrinsic calibration parameters associated with the imaging sensor can be identified, such as by identifying translational and rotational offsets associated with the imaging sensor. For a specified pixel in the image, a position of the specified pixel within a pixel coordinate system associated with the image can be converted to a corresponding position within a road coordinate system based on the extrinsic calibration parameters. The specified pixel may represent a point in the image associated with the one or more objects and/or the one or more lane marking lines. In some cases, the conversion may be performed using the assumption that the imaging sensor is a pinhole camera and using intrinsic calibration parameters associated with the imaging sensor. A distance to the point in the image can be identified based on the corresponding position of the specified pixel within the road coordinate system. In some cases, an object in the image is associated with a bounding box defined around the object, and the specified pixel is associated with a center of a bottom edge of the bounding box such that the distance represents a distance from the vehicle to the object. The identified distance may be used in any suitable manner, such as to control an operation of the vehicle based on the identified distance. In some cases, the controlled operation may include triggering an alarm or other notification to a driver of the vehicle; wirelessly transmitting information to a remote driver monitoring system or other remote system; causing the vehicle to speed up, slow down, change lanes, or take other evasive action; or performing any other suitable action(s). Note that this process can be repeated for any number of pixels within the image and for any number of images, such as a sequence of images captured during travel of the vehicle.

There are various other applications in which the conversion of pixels within a pixel coordinate system associated with one or more images to corresponding positions within a road coordinate system may be used. For example, an image of a scene may be obtained using an imaging sensor on a vehicle, where the image captures an object and one or more lane marking lines. Positions of multiple pixels within a pixel coordinate system associated with the image can be converted to multiple corresponding positions within a road coordinate system, where the multiple pixels are associated with the object and the one or more lane marking lines. At least one polynomial can be fit to the corresponding positions within the road coordinate system associated with the one or more lane marking lines, where each polynomial identifies a path of one of the one or more lane marking lines. A determination can be made whether the object is located within a lane in which the vehicle is traveling, where the lane is at least partially defined by the at least one polynomial. In some cases, multiple polynomials may be generated and used to define the lane, or a polynomial may be generated and used to at least partially define the lane. Also, in some cases, the one or more polynomials may represent one or more second-order polynomials. A determination that the object is located within the lane may be used in any suitable manner, such as to control an operation of the vehicle based on the determination. The controlled operation may include triggering an alarm or other notification to a driver of the vehicle if the vehicle is too close to the object or is approaching the object too rapidly; wirelessly transmitting information to a remote driver monitoring system or other remote system; causing the vehicle to slow down, change lanes, or take other evasive action; or performing any other suitable action(s). Note that this process can be repeated for any number of images, such as a sequence of images captured during travel of the vehicle.

As another example, an image of a scene may be obtained using an imaging sensor on a vehicle, where the image captures one or more lane marking lines. Positions of multiple pixels within a pixel coordinate system associated with the image can be converted to multiple corresponding positions within a road coordinate system, where the multiple pixels are associated with the one or more lane marking lines. At least one polynomial can be fit to the corresponding positions within the road coordinate system associated with the one or more lane marking lines, where each polynomial identifies a path of one of the one or more lane marking lines. A path of a non-visible portion of each of the one or more lane marking lines can be extrapolated based on the at least one polynomial, such as by identifying a closest point of the polynomial to the vehicle and identifying a straight line leading to the closest point of the polynomial. In some cases, the straight line can represent the path of the non-visible portion of the associated lane marking line and may have a slope that matches a tangent of the polynomial at the closest point. A lateral distance of the vehicle to the path of the non-visible portion of each of the one or more lane marking lines can be estimated. For instance, a first lateral distance within the road coordinate system from a specified point associated with the vehicle to the straight line may be estimated, and a second lateral distance within the road coordinate system from a side of the vehicle to the straight line may be estimated based on the first lateral distance. In some cases, the one or more polynomials may represent one or more second-order polynomials. The lateral distance of the vehicle from one or more lane marking lines may be used in any suitable manner, such as to control an operation of the vehicle based on the distance(s). The controlled operation may include triggering an alarm or other notification to a driver of the vehicle if the vehicle is approaching, is crossing, or has crossed one of the one or more lane marking lines (possibly without using a turn signal indicator); wirelessly transmitting information to a remote driver monitoring system or other remote system; causing the vehicle to remain in a current lane or take other action; or performing any other suitable action(s). Note that this process can be repeated for any number of images, such as a sequence of images captured during travel of the vehicle.

In this way, the disclosed techniques allow for the effective conversion of image data (such as raw image data) generated by a vision system or other imaging system from a pixel coordinate system to a road coordinate system. The image data in the road coordinate system can be used to support various functions associated with vehicle monitoring, driver monitoring, or other functions. Moreover, coordinates of objects like other vehicles and lane marking lines in the road coordinate system can be generated with high accuracy. This allows the accurate coordinates in the road coordinate system to be used in various applications with improved results, such as when the accurate coordinates in the road coordinate system help to reduce false alarms and generate more accurate indicators related to a vehicle following another vehicle too closely, approaching another vehicle too quickly, or approaching or crossing a lane marking line without signaling. In addition, the conversion can be based on the use of closed-formed expressions, which can be used to define a system of equations that can be solved analytically in order to identify the coordinates in the road coordinate system. This enables the disclosed techniques to be used to quickly identify coordinates in the road coordinate system for many images (possibly from multiple imaging sensors) captured over time during operation of a vehicle.

FIG. 1 illustrates an example system 100 supporting the conversion of computer vision data into measurements for an ADAS or other system according to this disclosure. As shown in FIG. 1, the system 100 includes or is used in conjunction with a vehicle 102. In this particular example, the vehicle 102 represents a tractor-trailer truck, which includes a tractor having a cab in which a driver sits and a trailer pulled by the tractor. Note, however, that this type of vehicle 102 is for illustration only and that the system 100 may be used with any other suitable type of vehicle. Other example types of vehicles that can be used here may include passenger sedans, pickup trucks, sport utility vehicles, passenger vans, box trucks, and buses.

The vehicle 102 has an imaging system 104, which in this example may be mounted on the interior surface of a front windshield of the vehicle 102. Note, however, that the actual position of the imaging system 104 can vary as needed or desired. The imaging system 104 includes one or more cameras or other imaging sensors 106 that are used to capture images or other image-related data associated with the vehicle 102. For example, the imaging system 104 may include one or more forward-facing imaging sensors that are used to capture images of scenes in front of the vehicle 102, such as images of the road or other surface in front of the vehicle 102. These images may capture lane marking lines that identify the current traffic lane in which the vehicle 102 is traveling and one or more other traffic lanes supporting traffic flow in the same direction and/or in different direction(s). The images may also capture one or more other vehicles traveling in the same direction as the vehicle 102 and/or in other direction(s). The images may further capture other content, such as pedestrians, light poles, buildings, or background (such as the ground, sky, hills, mountains, etc.). In some cases, the imaging system 104 may also include at least one driver-facing imaging sensor, which may be used to capture images of the driver of the vehicle 102. These images may be used, for instance, to determine if the driver is looking at his or her mobile phone, is drowsy, or otherwise might be inattentive. However, the use of any driver-facing imaging sensor is optional here.

The vehicle 102 also includes at least one processing device 108, which can process one or more types of information in the vehicle 102 and perform one or more operations (where the specific information and operations can vary depending on the specific implementation). In this example, the processing device 108 can receive images from the imaging sensor(s) 106 of the imaging system 104 and process the images. For instance, the processing device 108 can analyze the images captured by the forward-facing imaging sensor(s) 106 of the imaging system 104 in order to detect lane marking lines, other vehicles, or other objects near the vehicle 102. The processing device 108 can also support the techniques described below to convert positions of pixels within a pixel coordinate system associated with the images to corresponding positions within a road coordinate system. The processing device 108 can further support the techniques described below to use pixels' positions within a road coordinate system to estimate whether another vehicle or other object is within the current lane in which the vehicle 102 is traveling and/or to estimate distances of the vehicle 102 to one or more lane marking lines. Note, however, that pixels' positions within a road coordinate system may be used in any suitable manner and is not limited to the specific applications described below. Optionally, the processing device 108 can process images captured by the driver-facing imaging sensor(s) 106, such as to identify any indicators or instances of the vehicle's driver becoming drowsy or otherwise being inattentive. The processing device 108 includes any suitable number(s) and type(s) of processors or other processing devices in any suitable arrangement. Example types of processing devices 108 include one or more microprocessors, microcontrollers, digital signal processors (DSPs), application specific integrated circuits (ASICs), field programmable gate arrays (FPGAs), or discrete circuitry.

The processing device 108 here is coupled to at least one memory 110, which can store any suitable instructions and data used, generated, or collected by the processing device 108. The memory 110 represents any suitable structure(s) capable of storing and facilitating retrieval of information, such as data, program code, and/or other suitable information on a temporary or permanent basis. For example, the memory 110 may represent at least one random access memory, read only memory, hard drive, Flash memory, optical disc, or any other suitable volatile or non-volatile storage device(s).

In this example, the processing device 108 is coupled to or can interact with one or more indicators 112, which may represent at least one audible, visual, tactile, or other indicator of the vehicle 102. In response to identifying that a specified condition exists, the processing device 108 may trigger at least one indicator 112 in order to notify the driver of the vehicle 102 of the specified condition. For example, if the processing device 108 detects that the vehicle 102 is approaching, is crossing, or has crossed a lane marking line while a turn signal indicator (blinker) of the vehicle 102 is not activated, the processing device 108 may trigger an indicator 112 informing the driver of the actual or potential lane departure. If the processing device 108 detects that the vehicle 102 is following another vehicle too closely, the processing device 108 may trigger an indicator 112 informing the driver of this condition. If the processing device 108 detects that the vehicle 102 is approaching another vehicle or other object at a high rate of speed, the processing device 108 may trigger an indicator 112 informing the driver of a potential collision. Note that the specified conditions sensed by the processing device 108 can vary and that the type(s) of indicator(s) 112 triggered by the processing device 108 can vary based on a number of factors.

The processing device 108 here can also communicate via at least one communication interface 114. The communication interface 114 may allow, for example, the processing device 108 to communicate with other components of the vehicle 102 itself, such as sensors, internal communication buses, engine components, or other components of the vehicle 102. The communication interface 114 may also or alternatively allow the processing device 108 to communicate with one or more external components outside the vehicle 102, such as one or more databases or analysis systems that store or process information from the vehicle 102. As a particular example, the processing device 108 may identify instances that are indicative of unsafe vehicle operations or inattentiveness of the driver of the vehicle 102, and the processing device 108 may communicate information identifying or related to those instances (such as timestamps, vehicle actions, driver actions, etc.) to an external system for processing or storage.

Although FIG. 1 illustrates one example of a system 100 supporting the conversion of computer vision data into measurements for an ADAS or other system, various changes may be made to FIG. 1. For example, various components shown in FIG. 1 may be combined, further subdivided, replicated, omitted, or rearranged and additional components may be added according to particular needs. Also, as noted above, the system 100 may involve the use of any other suitable type of vehicle 102. In addition, the use of the driver-facing imaging sensor(s) 106 and the identification of driver inattentiveness or other driver conditions are optional here.

Figure 2:
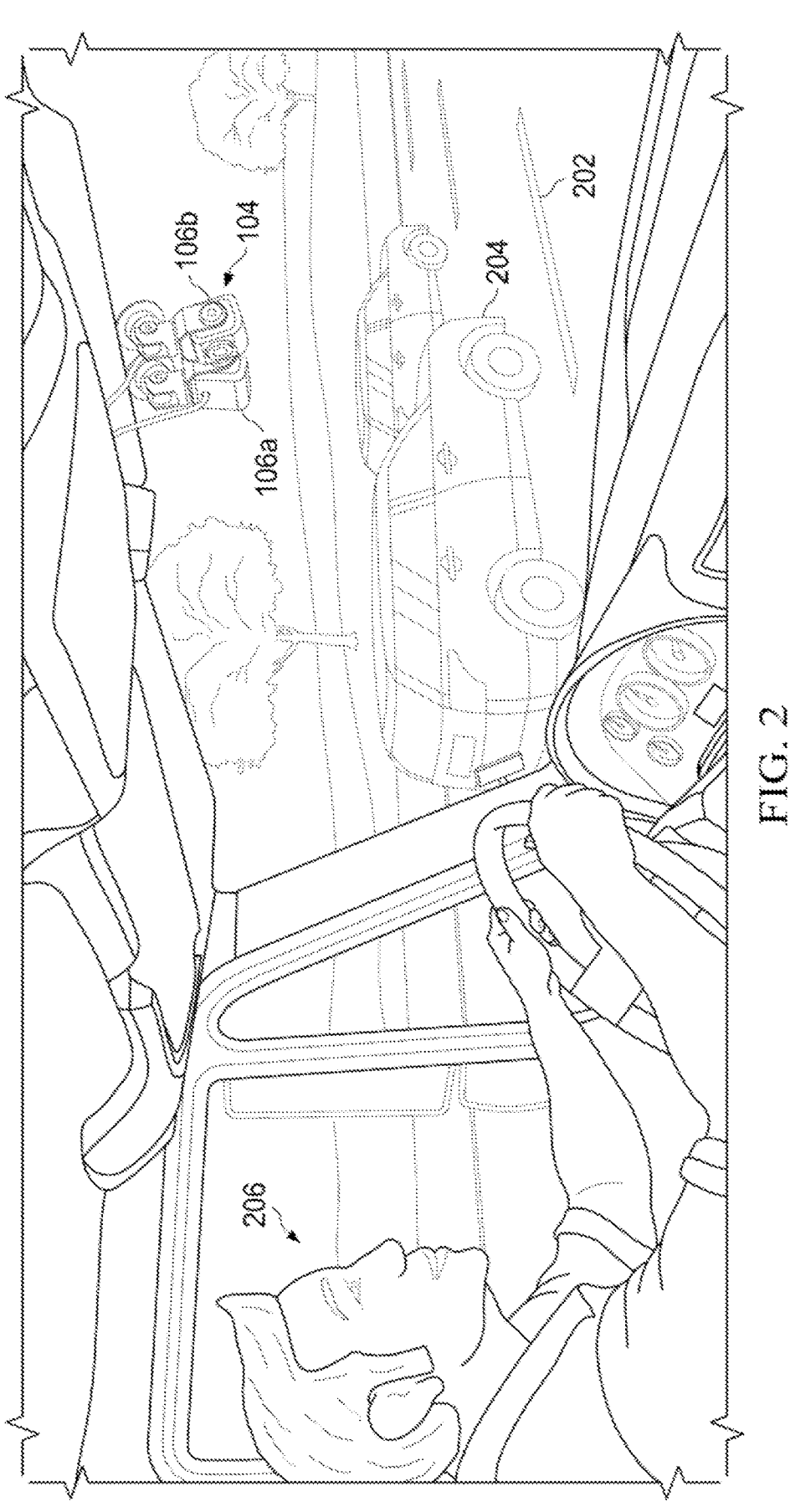
FIG. 2 illustrates an example arrangement of imaging sensors for use in an in-vehicle ADAS system or other system according to this disclosure.

FIG. 2 illustrates an example arrangement of imaging sensors 106 for use in an in-vehicle ADAS system or other system according to this disclosure. In this example, the imaging system 104 for the vehicle 102 is shown as being mounted to the interior surface of the front windshield of the vehicle 102, although the actual position of the imaging system 104 can vary from the position shown here. Note that any suitable mechanism may be used here to mount the imaging system 104 to the front windshield of the vehicle 102. Also note that any suitable mechanism may be used to facilitate communications between the imaging system 104 and the processing device 108 or other component(s), such as physical or wireless communications.

In this particular example, the imaging system 104 includes at least one forward-facing imaging sensor 106a and at least one driver-facing imaging sensor 106b. The at least one forward-facing imaging sensor 106a can be used to capture images or other image-related data associated with scenes in front of the vehicle 102. In the example shown in FIG. 2, for instance, the at least one forward-facing imaging sensor 106a may capture images of the traffic lane occupied by the vehicle 102 and possibly one or more adjacent traffic lanes. Here, the images may include lane marking lines 202 associated with the traffic lane(s) and other vehicles 204. In some embodiments, the imaging system 104 can be installed such that images captured by the forward-facing imaging sensor 106a contain a generally horizontal horizon and primarily capture the road or other surface ahead of the vehicle 102 while containing some lesser amount of sky, mountains, or other background. In particular embodiments, for example, the forward-facing imaging sensor 106a may capture images in which the upper quarter to upper third of the images contain sky, mountains, or other background. However, this is for illustration only, and any individual image can vary based on (among other things) the slope of the road or other surface on which the vehicle 102 is traveling.

The at least one driver-facing imaging sensor 106b is optional in the vehicle 102 and may be used to capture images or other image-related data associated with a driver 206 of the vehicle 102. The processing device 108 may process the images or other data from the at least one driver-facing imaging sensor 106b in order to estimate a measure of the attentiveness or inattentiveness or other condition of the driver 206. For example, the processing device 108 may support the use of the SMARTSENSE FOR INATTENTIVE DRIVING technology from OMNITRACS, LLC in order to detect and quantify driver inattentiveness.

As described in more detail below, images captured using the forward-facing imaging sensor 106a are provided to the at least one processing device 108 for analysis. Among other things, the processing device 108 can convert positions of pixels contained in captured images within a pixel coordinate system associated with the images into corresponding positions within a road coordinate system. The processing device 108 can also determine distances associated with the vehicle 102 using the positions of the pixels within the road coordinate system. For example, the processing device 108 may determine at least one distance from the vehicle 102 to one or more other vehicles 204 or other objects, at least one lateral distance from the vehicle 102 to one or more of the lane marking lines 202, or other distances involving the vehicle 102.

Although FIG. 2 illustrates one example of an arrangement of imaging sensors 106a-106b for use in an in-vehicle ADAS system or other system, various changes may be made to FIG. 2. For example, the actual position(s) of the imaging sensors 106a-106b in the vehicle 102 may vary from the positions that are shown here. Also, the imaging sensors 106a-106b may have any other suitable form factor. In addition, while both forward-facing and driver-facing imaging sensors 106a-106b are shown here, the driver-facing imaging sensor(s) 106b may be omitted if desired.

Figure 3A:
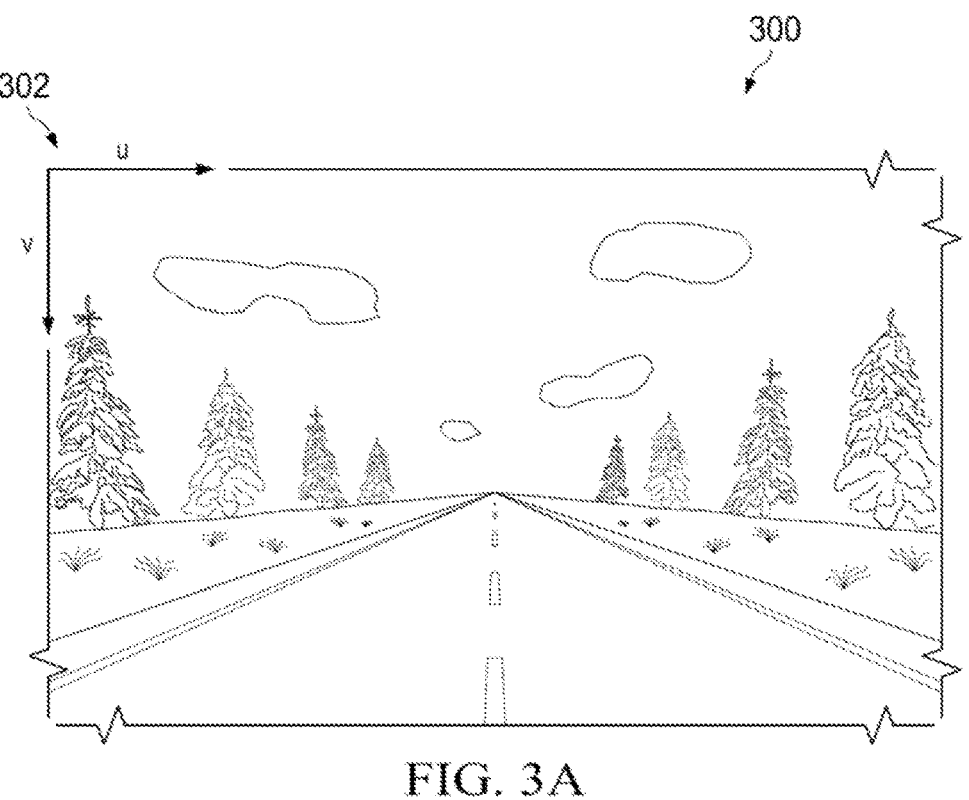
FIGS. 3A and 3B illustrate example coordinate systems associated with an in-vehicle ADAS system or other system according to this disclosure.
Figure 3B:
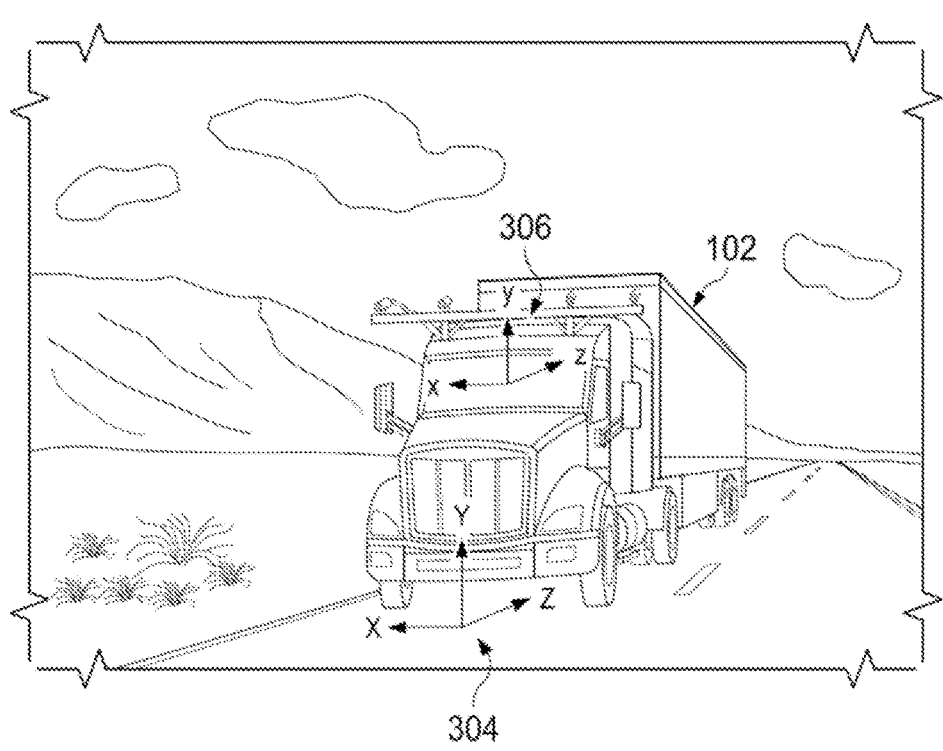

FIGS. 3A and 3B illustrate example coordinate systems associated with an in-vehicle ADAS system or other system according to this disclosure. As shown in FIG. 3A, an image 300 of a scene is shown and may represent at least part of an image captured using the forward-facing imaging sensor(s) 106a of the vehicle 102. The image 300 here is associated with a pixel coordinate system 302, which includes a horizontal axis (denoted the u axis) and a vertical axis (denoted the v axis). In this example, the pixel coordinate system 302 has an origin at the upper left corner of the image 300, although this is for illustration only. Each pixel within the image 300 may therefore be defined as having a discrete position using an integer-valued tuple (u, v).

The vehicle 102 itself is associated with a road coordinate system 304, which includes a horizontal axis (denoted the X axis) extending across the width of the vehicle 102, a vertical axis (denoted the Y axis) extending across the height of the vehicle 102, and a horizontal axis (denoted the Z axis) extending along the length of the vehicle 102. Here, coordinates of lane marking lines, other vehicles, or other objects around the vehicle 102 may be expressed using a continuous-valued tuple (X, Y, Z) (where X, Y, Z∈ ℝ). Each of the (X, Y, Z) tuples corresponds to a location in three-dimensional (3D) world coordinates, where the origin of the road coordinate system 304 is located at the center of the vehicle's front bumper at ground level. The orientation of the road coordinate system 304 is such that the X-Z plane lies in a plane of the (assumed flat) road.

The forward-facing imaging sensor 106a of the vehicle 102 has a similar camera coordinate system 306 with x, y, and z axes. In the camera coordinate system 306, coordinates of lane marking lines, other vehicles, or other objects around the vehicle 102 may be expressed using a continuous-valued tuple (x, y, z) (where x, y, z∈ ℝ). Each of the (x, y, z) tuples corresponds to a location in 3D world coordinates, where the origin of the camera coordinate system 306 is located at the center of the forward-facing imaging sensor 106a (which may be considered to function as a pinhole camera). The x axis of the camera coordinate system 306 extends in the same direction as the u axis of the pixel coordinate system 302, and the y axis of the camera coordinate system 306 extends in the same direction as the −v axis of the pixel coordinate system 302. It should be noted here that the forward-facing imaging sensor 106a may not actually represent a pinhole camera since it can include a lens that focuses light onto a sensor. However, treating the forward-facing imaging sensor 106a as if it is a pinhole camera can be justified since the distance between the lens and the sensor in the forward-facing imaging sensor 106a is much smaller than the distance between the lens and an object far away from the forward-facing imaging sensor 106a being viewed (this is called "pinhole approximation").

In general, effectively determining distances between the vehicle 102 and lane marking lines, other vehicles, or other objects depends on an accurate transformation between the pixel coordinate system 302 and the road coordinate system 304. The techniques described below support such an accurate transformation between the pixel coordinate system 302 and the road coordinate system 304. This allows for effective determination of the distances between the vehicle 102 and the lane marking lines, other vehicles, or other objects. This also allows for other applications that operate based on the identified distances between the vehicle 102 and the lane marking lines, other vehicles, or other objects to produce more accurate results.

In the discussion below, the following nomenclature is used. The terms $T_x$, $T_y$, and $T_z$ refer to translational offsets from the origin of the camera coordinate system 306 to the origin of the road coordinate system 304 along the x, y, and z axes. The terms $R_x$, $R_y$, and $R_z$ refer to rotational offsets about the x, y, and z axes needed to transform coordinates from the camera coordinate system 306 to the road coordinate system 304. Here, $R_x$ identifies the pitch of the forward-facing imaging sensor 106a. $R_y$ identifies the yaw of the forward-facing imaging sensor 106a, and R identifies the roll of the forward-facing imaging sensor 106a. The translational offsets and the rotational offsets represent extrinsic calibration parameters of the forward-facing imaging sensor

106a. The techniques described below can use at least some of these extrinsic calibration parameters during transformation between the pixel coordinate system 302 and the road coordinate system 304. For instance, the techniques described below can use values for $T_x$, $T_y$, $T_z$, $R_x$, and $R_y$. In some cases, it may be assumed that $R_z$=0, which can simplify distance calculations or other calculations while having minimal impact on the accuracy of the calculations. This is because rotating the forward-facing imaging sensor 106a about its z axis can have far less impact on the calculations compared to rotating the forward-facing imaging sensor 106a about its x and y axes. However, in other cases, the value of $R_z$ may be determined and used during various calculations.

In some embodiments, manual or other measurements can be used to identify distances of the forward-facing imaging sensor 106a from one or more specified points or axes of the vehicle 102. These measurements can be used to define the $T_x$, $T_y$, and $T_z$ translational offsets between the origins of the coordinate systems 304 and 306. For example, at least one person may use a tape measure or other mechanism to identify the side-to-side distance between a center of the vehicle's front bumper and the position of the forward-facing imaging sensor 106a (a measure of $T_x$), the up-down distance from the ground at the center of the vehicle's front bumper and the position of the forward-facing imaging sensor 106a (a measure of $T_y$), and the front-to-back distance between the center of the vehicle's front bumper and the position of the forward-facing imaging sensor 106a (a measure of $T_z$). Note that these measurements may or may not have high accuracy. In some cases, for example, calculations may be performed effectively with suitably-low error even when the translational distances $T_x$, $T_y$, and $T_z$ have an accuracy of one or several inches. As a particular example, in some cases, the $T_y$ translational distance may only need to be accurate to within about six inches. Also, in some embodiments, it is possible to derive values for at least some of the rotational offsets in an automated manner. For instance, U.S. patent application Ser. No. 17/514,912 filed on Oct. 29, 2021 (which is hereby incorporated by reference in its entirety) describes example techniques for determining $R_x$ and $R_y$ rotational offsets based on captured images, and these techniques may be used here. However, any other suitable approaches may be used to determine at least pitch $R_x$ and yaw $R_y$ (and optionally roll $R_z$) of the forward-facing imaging sensor 106a.

Although FIGS. 3A and 3B illustrate examples of coordinate systems 302, 304, and 306 associated with an in-vehicle ADAS system or other system, various changes may be made to FIGS. 3A and 3B. For example, the forward-facing imaging sensor 106a may be positioned elsewhere on the vehicle 102, so there may be different translational offsets between the origins of the coordinate systems 304 and 306. Also, the camera coordinate system 306 of the forward-facing imaging sensor 106a can vary based on the orientation of the forward-facing imaging sensor 106a on the vehicle 102, so there may be different rotational offsets between the coordinate systems 304 and 306.

Figure 4:
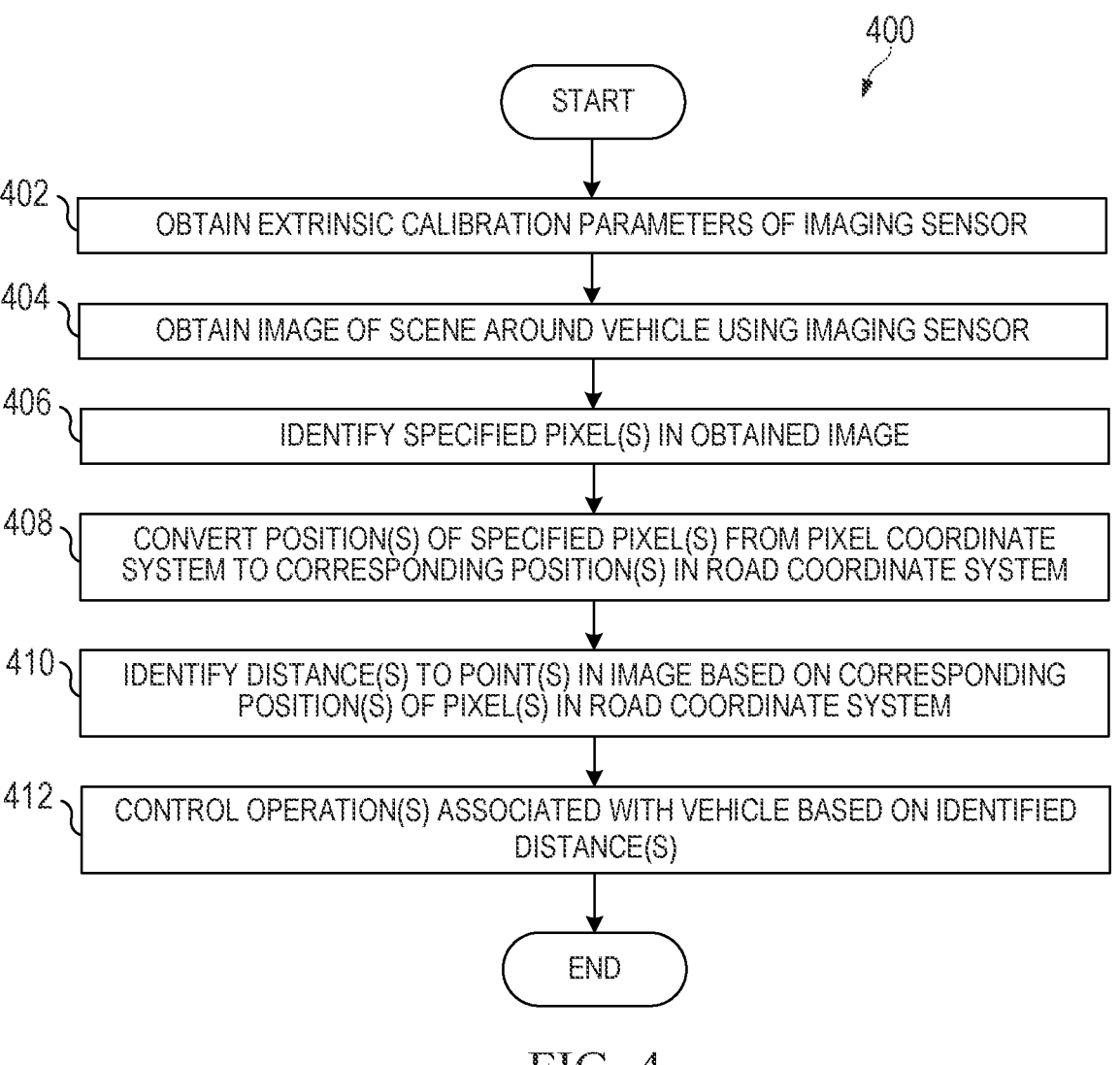
FIG. 4 illustrates an example method for converting computer vision data into measurements for an in-vehicle ADAS or other system according to this disclosure.

FIG. 4 illustrates an example method 400 for converting computer vision data into measurements for an in-vehicle ADAS or other system according to this disclosure. For ease of explanation, the method 400 is described as being performed using the forward-facing imaging sensor 106a and the processing device 108 in the vehicle 102 of FIG. 1. However, the method 400 may be performed using any other suitable device(s) and in any other suitable vehicle(s).

As shown in FIG. 4, extrinsic calibration parameters associated with a forward-facing imaging sensor on a vehicle are obtained at step 402. This may include, for example, the processing device 108 identifying multiple translational offsets and multiple rotational offsets associated with the forward-facing imaging sensor 106a. As noted above, in some cases, the translational offsets may be obtained using manual measurements, and the rotational offsets may be obtained using automated measurements. However, this is not necessarily required, and each of the translational and rotational offsets may be identified in any suitable manner. Note that other measurements of the vehicle 102 itself might also be obtained here, such as a measure of the total horizontal width of the vehicle 102 (like a measure of outside bumper-to-outside bumper distance or a measure of outside tire-to-outside tire distance of the vehicle 102). In some embodiments, the translational and rotational offsets and any other measurements to be used may be previously stored, such as in the memory 110, and retrieved by the processing device 108 when needed or desired.

An image of a scene around the vehicle is obtained at step 404. This may include, for example, the processing device 108 obtaining one or more images captured by the forward-facing imaging sensor 106a, such as during a time period when the vehicle 102 is being driven. In some cases, the forward-facing imaging sensor 106a may capture multiple images in rapid succession, such as when the images are captured by the forward-facing imaging sensor 106a at a rate of fifteen frames per second or some other rate. While the discussion below refers to processing a single image, the same processing may occur for each image or for each of a subset of the images.

At least one specified pixel is identified in the obtained image at step 406. This may include, for example, the processing device 108 performing object recognition or other image processing operations to identify any lane marking lines 202, other vehicles 204, or other objects in the obtained image. In some cases, each specified pixel may be associated with a lane marking line, other vehicle, or other object. In some cases, the processing device 108 may identify a collection of pixels associated with each lane marking line 202, such as pixels associated with locations where the lane marking line(s) 202 can be seen extending away from the vehicle 102 in front of the vehicle 102. Also, in some cases, the processing device 108 may identify, a bounding box around each other vehicle 204 or other object and select a specific pixel located on the bounding box, such as a pixel positioned at the center of a bottom edge of the bounding box (although other pixels in other locations associated with the bounding box may be identified). Note, however, that the specified pixel(s) may be selected in any suitable manner, which in some cases might include selecting all pixels.

A position of each specified pixel is converted from a pixel coordinate system into a corresponding position in a road coordinate system at step 408. This may include, for example, the processing device 108 using the extrinsic calibration parameters associated with the forward-facing imaging sensor 106a to convert coordinates of pixels in the pixel coordinate system 302 to corresponding coordinates in the road coordinate system 304. In some embodiments, the conversion may also be dependent on intrinsic calibration parameters of the forward-facing imaging sensor 106a, which in some cases can include multiple parameters that describe the geometry of a camera with a mostly-spherical lens.

A distance to a point in the image represented by each specified pixel is determined based on the corresponding position of the specified pixel in the road coordinate system at step 410. This may include, for example, the processing device 108 identifying a distance from the center point of the front bumper of the vehicle 102 at ground level to the coordinates of each specified pixel in the road coordinate system 304. As a particular example, this may include the processing device 108 calculating the Euclidean distance or using another distance calculation to identify the distance from the origin of the road coordinate system 304 to the 3D location of each specified pixel as determined through the conversion.

The identified distance(s) may be used in any suitable manner. For instance, one or more operations associated with the vehicle can be controlled based on the identified distance(s) at step 412. This may include, for example, the processing device 108 triggering one or more indicators 112 in response to one or more detected conditions. Example conditions may include the processing device 108 detecting that the vehicle 102 is approaching, is crossing, or has crossed a lane marking line 202 while a turn signal indicator of the vehicle 102 is not activated, detecting that the vehicle 102 is following another vehicle 204 too closely, or detecting that the vehicle 102 may impact another vehicle 204 or other object. This may also include the processing device 108 identifying an instance of driver inattentiveness or other driver characteristic(s) in response to detecting one or more of these conditions and/or initiating wireless communication of information related to the detected condition(s) to a remote driver monitoring system or other remote system. This may further include the processing device 108 causing the vehicle 102 to take evasive action, such as by causing the vehicle 102 to speed up, slow down, change lanes, or stay in the current lane.

Although FIG. 4 illustrates one example of a method 400 for converting computer vision data into measurements for an in-vehicle ADAS or other system, various changes may be made to FIG. 4. For example, while shown as a series of steps, various steps in FIG. 4 may overlap, occur in parallel, occur in a different order, or occur any number of times. As a particular example, steps 404-412 may be performed repeatedly for one or more sequences or other collections of images captured using one or more imaging sensors 106.

In some embodiments, the conversion of image data from the pixel coordinate system 302 to the road coordinate system 304 may be based on the following. As noted above with reference to FIGS. 3A and 3B, the extrinsic calibration parameters for the forward-facing imaging sensor 106a may include three translation offsets ($T_x$, $T_y$, and $T_z$) and two or three rotational offsets ($R_x$, $R_y$, and optionally $R_z$). These variables parameterize the transformation between the (x, y, z) camera coordinate system 306 of the forward-facing imaging sensor 106a and the (X, Y, Z) road coordinate system 304 of the vehicle 102. In some embodiments, the relationship between these coordinate systems 304 and 306 may be expressed using homogeneous coordinates as follows.

$$\begin{pmatrix} x \\ y \\ z \end{pmatrix} = \begin{pmatrix} 1 & 0 & 0 & T_x \\ 0 & 1 & 0 & T_y \\ 0 & 0 & 1 & T_z \end{pmatrix} \begin{pmatrix} 1 & 0 & 0 & 0 \\ 0 & \cos R_x & \sin R_x & 0 \\ 0 & -\sin R_x & \cos R_x & 0 \\ 0 & 0 & 0 & 1 \end{pmatrix} \begin{pmatrix} \cos R_y & 0 & -\sin R_y & 0 \\ 0 & 1 & 0 & 0 \\ \sin R_y & 0 & \cos R_y & 0 \\ 0 & 0 & 0 & 1 \end{pmatrix} \begin{pmatrix} X \\ Y \\ Z \\ 1 \end{pmatrix} \quad (1)$$

Note that the rotations here are passive transformations and that it is explicitly assumed $R_z=0$ (meaning the roll of the forward-facing imaging sensor 106a is zero). As noted above, this can be assumed since $R_z$ may have a minimal effect on estimating distances to objects or performing other calculations, although this assumption may not be used in other embodiments.

Equation (1) above represents the transformation between the camera coordinate system 306 and the road coordinate system 304. To complete the transformation between the pixel coordinate system 302 and the road coordinate system 304, a transformation between the camera coordinate system 306 and the pixel coordinate system 302 can be defined. Here, the forward-facing imaging sensor 106a can be assumed to be a pinhole camera, which supports the use of a pinhole approximation as noted above. With this assumption, the transformation between the camera coordinate system 306 and the pixel coordinate system 302 can be performed using intrinsic calibration parameters of the forward-facing imaging sensor 106a. The intrinsic calibration parameters for the forward-facing imaging sensor 106a may include four parameters that describe the geometry of a camera with a mostly-spherical lens. More specifically, the intrinsic calibration parameters for the forward-facing imaging sensor 106a may include two focal lengths ($f_x$ and $f_y$) and two focal centers ($c_x$ and $c_y$). The focal centers $c_x$ and $c_y$ can be defined as the x and y positions of the forward-facing imaging sensor 106a relative to the center of a pinhole lens.

Using these parameters, it is possible to transform image data between the pixel coordinate system 302 and the camera coordinate system 306. For example, projective geometry (which involves a transformation called a "homography" in computer vision) may be used and can be expressed as follows.

$$\begin{pmatrix} u \\ v \\ 1 \end{pmatrix} = \frac{1}{z} \begin{pmatrix} f_x & 0 & c_x \\ 0 & f_y & c_y \\ 0 & 0 & 1 \end{pmatrix} \begin{pmatrix} 1 & 0 & 0 \\ 0 & -1 & 0 \\ 0 & 0 & -1 \end{pmatrix} \begin{pmatrix} x \\ y \\ z \end{pmatrix} \quad (2)$$

In Equation (2), the tuple (x, y, z) represents the same tuple used in Equation (1). Here, it can be seen that the point (u, v) in the pixel coordinate system 302 can be extracted from Equation (2).

Further simplifications of the above conversion are possible. For example, it may be assumed that the lens of the forward-facing imaging sensor 106a is spherically symmetric and that there is no spherical distortion. Based on this, the focal lengths $f_x$ and $f_y$ may be assumed to be equal, meaning $f_x=f_y=f$. In some cases, any spherical distortion that is present may be removed algorithmically or in any other suitable manner, such as by pre-processing the images obtained using the forward-facing imaging sensor 106a to remove all or substantially all spherical distortion that might be present.

Based on Equations (1) and (2), it is possible to convert positions of pixels within the pixel coordinate system 302 associated with the images obtained using the forward-facing imaging sensor 106a into corresponding positions within the road coordinate system 304. However, the transformation from the pixel coordinate system 302 to the road coordinate system 304 is not invertible. This is because, given a pixel location (u, v) within the pixel coordinate system 302, there are an infinite number of points (x, y, z) within the camera coordinate system 306 and (X, Y, Z) within the road coordinate system 304 (all of which exist on a line) that map to the same point (u, v). Fortunately, this degeneracy can be broken by restricting the solution to identifying a mapping between a pixel position (u, v) and a point in the plane of the road, meaning in the X-Z plane of the road coordinate system 304 (so Y=0). Surprisingly, there is a closed-formed expression for such a mapping. To derive this, note that Equation (2) can be solved for (x, y z) via a matrix inversion and setting it equal to the right-hand side of Equation (1). This can be expressed as follows.

$$\begin{pmatrix} 1/f & 0 & -c_x/f \\ 0 & 1/f & -c_y/f \\ 0 & 0 & 1 \end{pmatrix} \begin{pmatrix} uz \\ vz \\ z \end{pmatrix} = \quad (3)$$

$$\begin{pmatrix} 1 & 0 & 0 & T_x \\ 0 & 1 & 0 & T_y \\ 0 & 0 & 1 & T_z \end{pmatrix} \begin{pmatrix} 1 & 0 & 0 & 0 \\ 0 & \cos R_x & \sin R_x & 0 \\ 0 & -\sin R_x & \cos R_x & 0 \\ 0 & 0 & 0 & 1 \end{pmatrix} \begin{pmatrix} \cos R_y & 0 & -\sin R_y & 0 \\ 0 & 1 & 0 & 0 \\ \sin R_y & 0 & \cos R_y & 0 \\ 0 & 0 & 0 & 1 \end{pmatrix} \begin{pmatrix} X \\ 0 \\ Z \\ 1 \end{pmatrix}$$

The matrix multiplication can be performed on both sides of Equation (3) to yield the following.

$$\begin{pmatrix} (u - c_x)z/f \\ (v - c_y)z/f \\ z \end{pmatrix} = \begin{pmatrix} T_x + X\cos R_y - Z\sin R_y \\ T_y + Z\cos R_y \sin R_x + X\sin R_x \sin R_y \\ T_z + Z\cos R_x \cos R_y + X\cos R_x \sin R_y \end{pmatrix} \quad (4)$$

This allows the following system of equations to be defined for converting pixel positions within the pixel coordinate system 302 into corresponding positions within the road coordinate system 304.

$$X = \frac{(\alpha T_y - \beta T_x)\cos R_x \cos R_y + (T_x - \alpha T_z)\sin R_x \cos R_y + (T_y - \beta T_z)\sin R_y}{\beta \cos R_x - \sin R_x} \quad (5)$$

$$Z = \frac{(T_y - \beta T_z)\cos R_y + (\beta T_x - \alpha T_y)\cos R_x \sin R_y + (-T_x + \alpha T_z)\sin R_x \sin R_y}{\beta \cos R_x - \sin R_x} \quad (6)$$

Here:

$$\alpha = \frac{u - c_x}{f} \quad (7)$$

$$\beta = \frac{v - c_y}{f} \quad (8)$$

As a reminder, u and v represent coordinates of a specified pixel within the pixel coordinate system 302, and X and Z represent coordinates of the corresponding position within the road coordinate system 304 (where it is assumed that Y=0 within the road coordinate system 304). Also, f represents a focal length associated with the forward-facing imaging sensor 106a, and $c_x$ and $c_y$ represent distances identifying a position of the forward-facing imaging sensor 106a relative to a center of a pinhole lens. In addition, $T_x$, $T_y$, and $T_z$ represent translational offsets and $R_x$ and $R_y$ represent rotational offsets associated with the forward-facing imaging sensor 106a. It should be noted that while two possible (X, Z) coordinates can actually be identified for the conversion using the closed-formed expression above, Equations (5) and (6) are for the coordinates associated with the forward direction ahead of the vehicle 102.

The approach described above therefore allows a point (u, v) in pixel coordinates within the pixel coordinate system 302 to be used (along with the extrinsic and intrinsic parameters of the forward-facing imaging sensor 106a) in order to identify a position (X, 0, Z) in the plane of the road within the road coordinate system 304. This allows the distance between the vehicle 102 and various points within each image to be determined and used for computer vision purposes or other purposes. For example, the distance between the vehicle 102 and another vehicle 204 or other object can be determined. As a particular example, a bounding box can be defined around the other vehicle 204 or other object, and the point selected for distance estimation can represent a point on or otherwise associated with the bounding box. One example point on or otherwise associated with the bounding box can be the center point of the bottom edge of the bounding box since that point is assumed to lie on a plane that bounds the rear end of the other vehicle 204 or other object. Equations (5) and (6) can therefore be used to calculate the distance of the vehicle 102 to the other vehicle 204 or other object on the road (where the distance is expressed in whatever units of distance $T_x$, $T_y$, and $T_z$ are measured). Note that Equations (5) and (6) may be invariant if the images from the forward-facing imaging sensor 106a are homogeneously rescaled, meaning the images are rescaled while keeping their aspect ratio the same. Other uses for the pixel conversion functionality may include lane object detection and lane marking line crossing detection.

FIG. 5 illustrates an example method 500 for lane object detection according to this disclosure. For ease of explanation, the method 500 is described as being performed using the forward-facing imaging sensor 106a and the processing device 108 in the vehicle 102 of FIG. 1. However, the method 500 may be performed using any other suitable device(s) and in any other suitable vehicle(s).

As shown in FIG. 5, an image of a scene around a vehicle is obtained at step 502. This may include, for example, the processing device 108 obtaining one or more images captured by the forward-facing imaging sensor 106a. Specified pixels associated with at least one object and at least one lane marking line are identified in the obtained image at step 504. This may include, for example, the processing device 108 performing object recognition or other image processing operations to identify any lane marking lines 202, other vehicles 204, or other objects in the obtained image(s). In some cases, the processing device 108 may identify, a collection of pixels associated with each lane marking line 202, such as pixels associated with locations where the lane marking line(s) 202 can be seen extending away from the vehicle 102 in front of the vehicle 102. Also, in some cases, the processing device 108 may identify a bounding box around each other vehicle 204 or other object and select a specific pixel located on the bounding box, such as a pixel positioned at the center of a bottom edge of the bounding box (although other pixels in other locations associated with the bounding box may be identified). Note, however, that the specified pixel(s) may be selected in any suitable manner.

A position of each specified pixel is converted from a pixel coordinate system into a corresponding position in a road coordinate system at step 506. This may include, for example, the processing device 108 performing some of the operations described above with respect to FIG. 4 in order to convert the positions of the specified pixels from the pixel coordinate system 302 into corresponding positions in the road coordinate system 304. In some cases, this can result in the generation of multiple positions within the road coordinate system 304 for each identified lane marking line 202 and one or more positions within the road coordinate system 304 for each identified vehicle 204 or other object.

A polynomial is fit to the corresponding positions of the pixels in the road coordinate system that are associated with each lane marking line at step 508. This may include, for example, the processing device 108 identifying the corresponding positions of the pixels associated with each lane marking line 202, which (depending on the lane marking line 202) may be continuous or discontinuous within the space defined by the road coordinate system 304. As particular examples, a solid lane marking line 202 may typically be associated with pixel positions that are continuous in the space defined by the road coordinate system 304, while a dashed lane marking line 202 may typically be associated with pixel positions that are discontinuous and grouped into multiple distinct sets in the space defined by the road coordinate system 304. This may also include the processing device 108 performing curve-fitting or using another algorithm to fit a polynomial onto the corresponding positions associated with each lane marking line 202. Each polynomial here identifies a path of the associated lane marking line 202 within the space defined by the road coordinate system 304. In some cases, this can be done for each lane marking line 202 that is identified. Also, in some embodiments, each polynomial represents a second-order polynomial, although polynomials of other orders (including a single order) may be used.

A determination is made whether any object is located within the same lane as the vehicle based on the identified polynomial(s) at step 510. This may include, for example, the processing device 108 determining whether a point on the bounding box of each identified object is within the current traffic lane being used by the vehicle 102. Note that this might be done only up to a certain distance away from the vehicle 102 since the accuracy of detecting lane marking lines 202 may tend to degrade at larger distances ahead of the vehicle 204. It should also be noted that this may depend at least partially on the number of lane marking lines 202 identified and whether the current traffic lane being used by the vehicle 102 is associated with two identified lane marking lines 202 or one identified lane marking line 202.

When the current traffic lane being used by the vehicle 102 is associated with two identified lane marking lines 202, this means that both sides of the current traffic lane being used by the vehicle 102 can be defined by multiple polynomials. In other words, those polynomials identify the paths of two lane marking lines 202 positioned on opposite sides of the vehicle 102, which allows the current traffic lane used by the vehicle 102 to be defined by those two lane marking lines 202. In these cases, the processing device 108 can determine whether at least one point of each identified vehicle 204 or other object (such as the center point of the bottom edge of the bounding box defined around that object) lies between the multiple polynomials within the road coordinate system 304.

When the current traffic lane being used by the vehicle 102 is associated with one identified lane marking line 202, this means that only one side of the current traffic lane being used by the vehicle 102 can be defined by a polynomial. In other words, the polynomial identifies the path of one lane marking line 202 positioned on one side of the vehicle 102, but the lane marking line 202 on the opposite side of the vehicle 102 has not been identified here. As a result, the current traffic lane used by the vehicle 102 may be partially defined by the one identified lane marking line 202. In those cases, the processing device 108 may take any suitable action in an attempt to identify the current traffic lane being used by the vehicle 102. In some embodiments, for instance, the processing device 108 may estimate the current traffic lane being used by the vehicle 102 based on the one identified lane marking line 202, such as by assuming that the road or other surface on which the vehicle 102 is traveling is straight and has the width of the vehicle 102 or some other distance. Based on those assumptions, the processing device 108 can estimate the current traffic lane being used by the vehicle 102 and determine whether at least one point of each identified vehicle 204 or other object (such as the center point of the bottom edge of the bounding box defined around that object) is within the estimated traffic lane within the road coordinate system 304.

The determination of whether any object is within the current traffic lane occupied by the vehicle may be used in any suitable manner. For instance, one or more operations associated with the vehicle can be controlled based on the determination at step 512. This may include, for example, the processing device 108 triggering one or more indicators 112 in response to one or more detected conditions. One example condition may include the processing device 108 detecting that the vehicle 102 is following too closely to another vehicle 204 within the current traffic lane being used by the vehicle 102. In some cases, this condition can be detected based on calculating the distance from the vehicle 102 to the other vehicle 204, such as by using the same techniques described above with reference to step 412 in FIG. 4, and comparing the distance to a threshold (which might be speed-dependent). Another example condition may include the processing device 108 detecting that the vehicle 102 may impact another vehicle 204 or other object within the current traffic lane being used by the vehicle 102. In some cases, this condition can be detected based on calculating the distance from the vehicle 102 to the other vehicle 204 or other object, such as by using the same techniques described above with reference to step 412 in FIG. 4, and using the speed of the vehicle 102 to generate an estimated time to impact. This may further include the processing device 108 causing the vehicle 102 to take evasive action, such as by causing the vehicle 102 to speed up, slow down, or change lanes.

Note that, in some embodiments, the method 500 may be performed only when the vehicle 102 exceeds a specified speed threshold and when the vehicle 102 is not approaching an intersection. In some cases, the vehicle 102 may be driven at a relatively high rate of speed during the image capture. In particular embodiments, the vehicle 102 may be driven at a speed of at least about 45 miles per hour (about 72.4 kilometers per hour). The relatively high rate of speed may help to ensure that the lane marking lines 202 will be straighter or have less curvature than would be experienced at lower rates of speed, and the lack of intersections may help to ensure that the lane marking lines 202 are only used to define traffic lanes and not other features. However, the vehicle 102 may be driven at faster or slower speeds or in any other suitable locations as needed or desired.

Although FIG. 5 illustrates one example of a method 500 for lane object detection, various changes may be made to FIG. 5. For example, while shown as a series of steps, various steps in FIG. 5 may overlap, occur in parallel, occur in a different order, or occur any number of times. As a particular example, steps 502-512 may be performed repeatedly for one or more sequences or other collections of images captured using one or more imaging sensors 106.

In some embodiments, the determination of whether another vehicle 204 or other object is within the current traffic lane being used by the vehicle 102 may be based on the following. For each identified lane marking line 202, a collection of pixel coordinates that overlay the identified lane marking line 202 within at least one image may be obtained. These pixel coordinates may have the form $((u_1, v_1), (u_2, v_2), \ldots, (u_N, v_N))$, where the position of each of N pixels associated with the identified lane marking line 202 is defined within the pixel coordinate system 302 using its it and v coordinates. Using the conversion process described above for converting pixel positions from the pixel coordinate system 302 into corresponding positions in the road coordinate system 304, the set of pixel coordinates associated with the identified lane marking line 202 may be converted from the pixel coordinate system 302 into a corresponding set of coordinates in the road coordinate system 304. This conversion may be achieved using the approach described above for each pixel in the set and may be expressed as follows.

$$((u_1, v_1), (u_2, v_2), \ldots, (u_N, v_N)) \rightarrow ((X_1, Z_1), (X_2, Z_2), \ldots, (X_N, Z_N)) \quad (9)$$

Here, the position of each of the N pixels within the pixel coordinate system 302 is converted into corresponding X and Z coordinates within the road coordinate system 304.

The collection of coordinates $((X_1, Z_1), (X_2, Z_2), \ldots, (X_N, Z_N))$ within the road coordinate system 304 can be used during polynomial fitting in order to identify a polynomial that defines the path of the associated lane marking line 202. For example, the collection of coordinates within the road coordinate system 304 for each identified lane marking line 202 can be fit with a second-order polynomial, such as one defined as follows.

$$\ell(Z) = aZ^2 + bZ + c \quad (10)$$

Here, a, b, and c are free parameters that can be set as part of the polynomial-fitting process. Note that this example polynomial is a function of Z (meaning $Z_1, Z_2, \ldots, Z_N$) rather than X. This is because such a polynomial may generally have smaller coefficients and therefore be more "natural." Equation (10) here defines the position of the associated lane marking line 202 in X.

Once at least one polynomial is generated to define the path of at least one lane marking line 202, the polynomial(s) can be used to determine whether any detected object is within the current traffic lane occupied by the vehicle 102. As described above, if two lane marking lines 202 identifying the current traffic lane occupied by the vehicle 102 can be identified, it can be determined whether a point on or associated with a bounding box around each object lies between the lane marking lines 202 as defined by multiple polynomials. If one lane marking line 202 associated with the current traffic lane occupied by the vehicle 102 can be identified, it may be assumed that the vehicle 102 is trav- eling on a straight road or other straight path and that the current traffic lane occupied by the vehicle 102 has the same width as the vehicle 102, and it can be determined whether a point on or associated with a bounding box around each object lies within the estimated traffic lane occupied by the vehicle 102. Note that if no polynomials can be identified for any lane marking lines 202, the processing device 108 may again assume that the vehicle is traveling on a straight path and that the current traffic lane occupied by the vehicle 102 has the same width as the vehicle 102. The processing device 108 may assume that a vertical line through a center of an image is "straight ahead," or the processing device 108 may attempt to determine whether other features within one or more images can be used to identify how "straight ahead" is defined. This may again allow the processing device 108 to determine whether a point on or associated with a bounding box around each object lies within the estimated traffic lane occupied by the vehicle 102.

Figure 6:
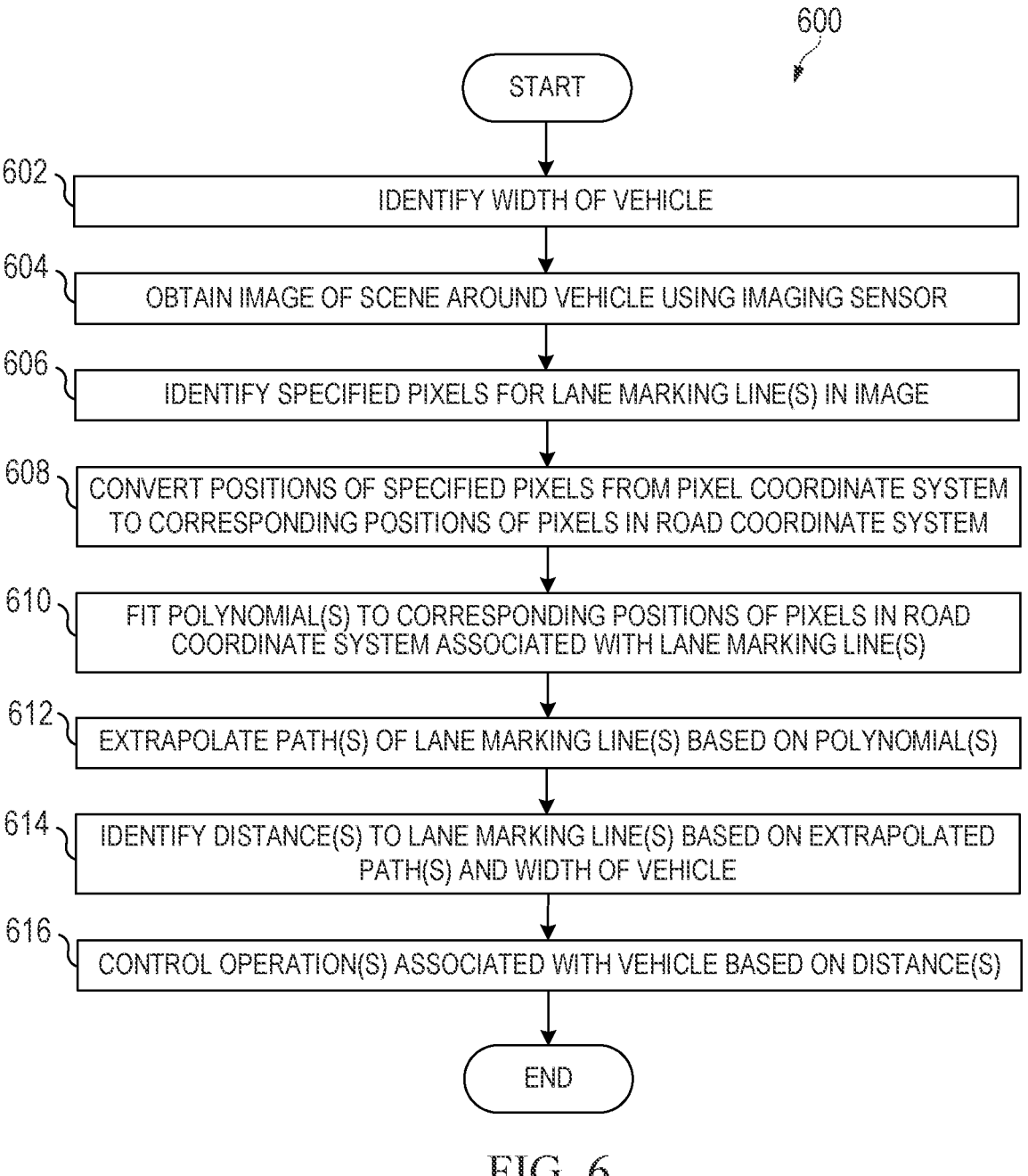
FIG. 6 illustrates an example method for distance estimation between a vehicle and one or more lane marking lines according to this disclosure.

FIG. 6 illustrates an example method 600 for distance estimation between a vehicle and one or more lane marking lines according to this disclosure. For ease of explanation, the method 600 is described as being performed using the forward-facing imaging sensor 106a and the processing device 108 in the vehicle 102 of FIG. 1. However, the method 600 may be performed using any other suitable device(s) and in any other suitable vehicle(s).

As shown in FIG. 6, a width of a vehicle is identified at step 602. This may include, for example, the processing device 108 identifying an outside bumper-to-outside bumper distance or an outside tire-to-outside tire distance of the vehicle 102, such as when this information was previously generated and stored in the memory 110. An image of a scene around the vehicle is obtained at step 604. This may include, for example, the processing device 108 obtaining one or more images captured by the forward-facing imaging sensor 106a.

Specified pixels associated with at least one lane marking line are identified in the obtained image at step 606. This may include, for example, the processing device 108 per- forming object recognition or other image processing opera- tions to identify any lane marking lines 202 in the obtained image(s). In some cases, the processing device 108 may identify a collection of pixels associated with each lane marking line 202, such as pixels associated with locations where the lane marking line(s) 202 can be seen extending away from the vehicle 102 in front of the vehicle 102. In some cases, the lane marking line(s) 202 being considered here may only include the one or two lane marking lines 202 associated with the current lane in which the vehicle 102 is traveling.

A position of each specified pixel is converted from a pixel coordinate system into a corresponding position in a road coordinate system at step 608. This may include, for example, the processing device 108 performing some of the operations described above with respect to FIG. 4 in order to convert the positions of the specified pixels from the pixel coordinate system 302 into corresponding positions in the road coordinate system 304. In some cases, this can result in the generation of multiple positions within the road coordi- nate system 304 for each identified lane marking line 202.

A polynomial is fit to the corresponding positions of the pixels in the road coordinate system that are associated with each lane marking line at step 610. This may include, for example, the processing device 108 identifying the corre- sponding positions of the pixels associated with each lane marking line 202. As noted above, each identified lane marking line 202 may be associated with continuous or discontinuous pixel positions in the space defined by the road coordinate system 304. This may also include the processing device 108 performing curve-fitting or using another algorithm to fit a polynomial onto the corresponding positions associated with each lane marking line 202. Each polynomial here identifies a path of the associated lane marking line 202 within the space defined by the road coordinate system 304. Also, in some embodiments, each polynomial represents a second-order polynomial, although polynomials of other orders (including a single order) may be used.

While the obtained image can show one or more lane marking lines 202 ahead of the vehicle 102, the image typically does not include the lane marking line(s) 202 at the locations of the front wheels of the vehicle 102 (due to the positioning of the forward-facing imaging sensor 106a). In order to compensate for this, the path of each lane marking line is extrapolated based on the identified polynomial(s) at step 612. This may include, for example, the processing device 108 estimating a path of a non-visible portion of each lane marking line 202 based on the polynomial for that lane marking line 202. Note that it may be tempting to simply extrapolate a fitted polynomial to the position of the vehicle 102. While this is reasonable, it does make a fundamental assumption that the curvature of the road or traffic lane ahead of the vehicle 102 provides information about the curvature of the road or traffic lane near the vehicle 102. This may be true in some circumstances but not true all the time, so using this assumption may lead to errors. Some embodi- ments may still use this approach and simply tolerate the errors.

In other embodiments, the processing device 108 may perform the extrapolation in the following manner. Here, it may be assumed that each identified lane marking line 202 is generally straight between the vehicle 102 and the closest visible portion of that identified lane marking line 202. This assumption is generally valid since it is highly unlikely for there to be significant curvature in each identified lane marking line 202 between the front wheels of the vehicle 102 and the location where that identified lane marking line 202 becomes visible in an image. Based on this assumption, a straight line can be extrapolated for each identified lane marking line 202, where the straight line extends from the closest point of the polynomial associated with that lane marking line 202 to the vehicle 102. In some cases, the straight line can be defined as having a slope that matches a tangent of the polynomial associated with the lane marking line 202 at the closest point. This can be done for one or both lane marking lines 202 defining the current traffic lane in which the vehicle 102 is traveling.

A distance to each lane marking line is identified based on the extrapolated path of that lane marking line and the width of the vehicle at step 614. This may include, for example, the processing device 108 determining a distance from at least one side of the vehicle 102 to the corresponding lane marking line 202 on that side of the vehicle 102. This can be done for one lane marking line 202 or multiple lane marking lines 202. In some cases, the processing device 108 can calculate the distance from a specified point of the vehicle 102 to each lane marking line 202 and use the width of the vehicle 102 to convert that distance into a distance from one side of the vehicle 102 to the lane marking line 202. As a particular example, the processing device 108 may calculate the distance from the center point of the front bumper of the vehicle 102 to each lane marking line 202 and subtract one half of the width of the vehicle 102 in order to convert that distance into a distance from one side of the vehicle 102 to the lane marking line 202. Note that the use of the center point of the front bumper of the vehicle 102 is for illustrative purposes only and that a non-center point of the vehicle 102 may be used (which may require subtraction of values other than one-half of the vehicle's width).

The identified distance(s) to one or more lane marking lines may be used in any suitable manner. For instance, one or more operations associated with the vehicle can be controlled based on the distance(s) at step 616. This may include, for example, the processing device 108 triggering one or more indicators 112 in response to one or more detected conditions. One example condition may include the processing device 108 detecting that the vehicle 102 is approaching, is crossing, or has crossed a lane marking line 202. In some cases, this condition can be detected based on calculating the distance from the vehicle 102 to each lane marking line 202 and determining if and when the distance reaches zero or goes negative for any lane marking line 202. This may also include the processing device 108 causing the vehicle 102 to take evasive action, such as by causing the vehicle 102 to change direction so as to stay within its current traffic lane.

Note that, in some embodiments, the method 600 may be performed only when the vehicle 102 exceeds a specified speed threshold (such as about 45 miles per hour or about 72.4 kilometers per hour) and when the vehicle 102 is not approaching an intersection. The relatively high rate of speed may help to ensure that the lane marking lines 202 will be straighter or have less curvature than would be experienced at lower rates of speed, and the lack of intersections may help to ensure that the lane marking lines 202 are only used to define traffic lanes and not other features. However, the vehicle 102 may be driven at faster or slower speeds or in any other suitable locations as needed or desired.

Although FIG. 6 illustrates one example of a method 600 for distance estimation between a vehicle and one or more lane marking lines, various changes may be made to FIG. 6. For example, while shown as a series of steps, various steps in FIG. 6 may overlap, occur in parallel, occur in a different order, or occur any number of times. As a particular example, steps 604-616 may be performed repeatedly for one or more sequences or other collections of images captured using one or more imaging sensors 106. Also, while the approach above is often described as being used with the lane marking line(s) 202 at least partially defining the current lane of the vehicle 102, the same or similar approach may be used to identify distances between the vehicle 102 and other objects, such as other lane marking lines.

In some embodiments, the determination of one or more distances between a vehicle 102 and one or more lane marking lines 202 may be based on the following. Assume that each of one or more lane marking lines 202 is fitted with a polynomial having the form of Equation (10) above. Also assume that, for each lane marking line 202, $Z_{min}$ represents the closest point of the associated polynomial to the vehicle 102 in the road coordinate system 304 that is visible in an image. A straight line that passes through $Z=Z_{min}$ can be defined for each lane marking line 202 during the extrapolation, and the straight line can have the same slope as the tangent of the polynomial for that lane marking line 202 at the point $Z=Z_{min}$. For each lane marking line 202, the straight line that is extrapolated may be denoted $\varepsilon(Z)$. In some cases, the straight line extrapolated for each lane marking line 202 may be parameterized as follows.

$$\varepsilon(Z) = \left( \frac{d\ell(Z_{min})}{dZ} \right) Z + \delta \tag{11}$$

In Equation (11), $d\ell(Z_{min})/dZ=2aZ_{min}+b$, and $\delta$ is a constant to be determined.

To determine the value of $\delta$, a constraint of $\ell(Z_{min})=\varepsilon(Z_{min})$ can be defined.

In some cases, this constraint may be expressed as follows.

$$aZ_{min}^2 + bZ_{min} + c = (2aZ_{min} + b)Z_{min} + \delta \tag{12}$$

Based on this, the following can be obtained.

$$\delta = -aZ_{min}^2 + c \tag{13}$$

Using this, the position in the X direction in the road coordinate system 304 between an extrapolated straight line at the position Z=0 is equal to $\varepsilon(Z=0)$, which may be expressed as follows.

$$\varepsilon(Z = 0) = -aZ_{min}^2 + c \tag{14}$$

Note that the assumption that the path of the vehicle 102 is straight means a=0, so $\varepsilon(Z=0)=c$. Also note that the calculated value of $\varepsilon$ can be negative here.

In this example, Equation (14) represents an estimate of the distance to a lane marking line 202 in the road coordinate system 304 when Z=0 and Y=0. In other words, Equation (14) defines the distance from the center of the front bumper of the vehicle 102 to the lane marking line 202 in the road coordinate system 304. To estimate the distance between each side of the vehicle 102 and the lane marking line 202 along that side of the vehicle 102, the following calculations can be used based on the width w of the vehicle 102 (such as the width as measured from the outsides of the front tires of the vehicle 102). Here, the distance $d_\ell$ from the lane marking line 202 and the outside of the vehicle's associated front tire can be expressed as follows.

$$d_\ell = |\varepsilon(Z = 0)| - \frac{w}{2} \tag{15}$$

$$d_\ell = \left| -aZ_{min}^2 + c \right| - \frac{w}{2} \tag{16}$$

In this approach, if $d_\ell$ has a negative value, the side of the vehicle 102 has crossed over the lane marking line 202. If $d_\ell$ is approaching or at zero, the side of the vehicle 102 is approaching or is crossing over the lane marking line 202. Note that this approach assumes the specified point of the vehicle 102 from which the initial distances in Equation (14) are measured is the center of the front bumper of the vehicle 102. If a different point is used, different versions of Equations (15) and (16) could be modified for different sides of the vehicle 102 in order to account for non-equal separation of the specified point from the two sides of the vehicle 102.

Figure 7:
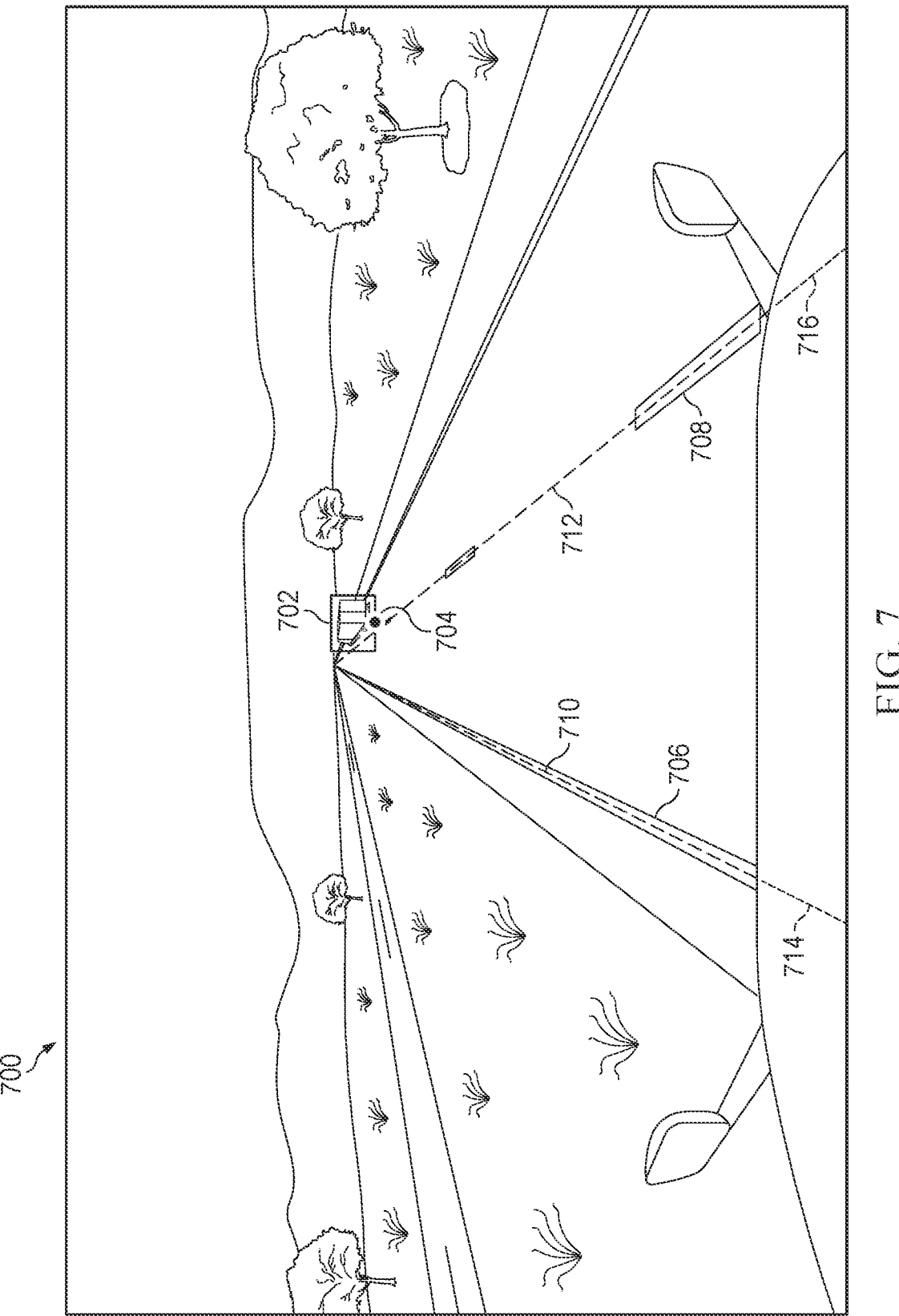
FIG. 7 illustrates an example image and associated processing results that may be obtained according to this disclosure.

FIG. 7 illustrates an example image 700 and associated processing results that may be obtained according to this disclosure. More specifically, the processing results shown in FIG. 7 relate to example results that may be obtained using the methods 400, 500, and 600 shown in FIGS. 4 through 6 and described above.

As shown in FIG. 7, the image 700 represents an image of a scene in front of the vehicle 102. In this example, an object (namely another vehicle) has been identified ahead of the vehicle 102, and a bounding box 702 has been defined around the other vehicle. A point 704 associated with the bounding box 702, such as a point at the center of the bottom edge of the bounding box 702, has also been identified here. The approach shown in FIG. 4 may be used to convert the position of the point 704 within the pixel coordinate system 302 associated with the image 700 into a corresponding position within the road coordinate system 304. Among other things, this may allow the processing device 108 to estimate a distance from the front of the vehicle 102 to the point 704, which may represent the location of the rear of the other vehicle. The distance to the other vehicle may be used for any suitable purpose by the processing device 108.

As also shown in FIG. 7, one or more lane marking lines 706, 708 may be captured in the image 700. The approach shown in FIG. 5 may be used to convert the position of the point 704 and the positions of pixels associated with the lane marking line(s) 706, 708 within the pixel coordinate system 302 into corresponding positions within the road coordinate system 304. This may allow the processing device 108 to fit one or more polynomials 710, 712 onto the one or more lane marking lines 706, 708 within the road coordinate system 304. If both lane marking lines 706 and 708 are identified, the processing device 108 can determine whether the point 704 of the other vehicle lies between the polynomials 710, 712 within the road coordinate system 304 in order to determine if the other vehicle is in the same traffic lane as the vehicle 102. If one lane marking line 706 or 708 is identified, the processing device 108 can determine whether the point 704 of the other vehicle lies within an estimated traffic lane (which can be defined based on one polynomial 710 or 712 and the width of the vehicle 102) in order to determine if the other vehicle is in the same traffic lane as the vehicle 102. If no lane marking lines are identified, the processing device 108 can determine whether the point 704 of the other vehicle lies within an estimated traffic lane (which can be defined based on the width of the vehicle 102) in order to determine if the other vehicle is in the same traffic lane as the vehicle 102. If the other vehicle is in the same traffic lane as the vehicle 102, the processing device 108 may perform one or more additional functions, such as determining whether the distance to the other vehicle indicates that the vehicle 102 is following the other vehicle too closely or might be approaching the other vehicle too quickly (thereby creating an impact concern).

As further shown in FIG. 7, each lane marking line 706, 708 is visible in front of the vehicle 102 but is not visible next to or near the front wheels or other portions of the vehicle 102. The approach shown in FIG. 6 may be used to convert the positions of pixels associated with the lane marking line(s) 706, 708 within the pixel coordinate system 302 into corresponding positions within the road coordinate system 304. This may allow the processing device 108 to fit one or more polynomials 710, 712 onto the one or more lane marking lines 706, 708 within the road coordinate system 304. The processing device 108 can also extrapolate the path of the non-visible portion of each lane marking line 706, 708, which can lead to the creation of an extrapolated path 714, 716 for each lane marking line 706, 708. The processing device 108 can use the one or more extrapolated paths 714, 716 in order to estimate one or more distances between the vehicle 102 and the lane marking line(s) 706, 708. The processing device 108 may perform one or more additional functions based on the identified distance(s), such as determining whether a distance indicates that the vehicle 102 is approaching, is crossing, or has crossed a lane marking line 706, 708.

Although FIG. 7 illustrates one example of an image 700 and associated processing results that may be obtained, various changes may be made to FIG. 7. For example, the contents of the image 700 and the processing results shown within the image 700 are for illustration and explanation only and can vary widely based on the specific circumstances. Moreover, the techniques shown in FIGS. 4 through 6 need not necessarily all be implemented within the vehicle 102, so a subset of the results shown in FIG. 7 may be produced.

Note that various functions described above as being performed in or by the vehicle 102 may be implemented in any suitable manner in the system 100. For example, in some embodiments, various functions described above as being performed in or by the vehicle 102 may be implemented or supported using one or more software applications or other software/firmware instructions that are executed by at least one processor or other processing device 108. In other embodiments, at least some of the functions described above as being performed in or by the vehicle 102 can be implemented or supported using dedicated hardware components. In general, the functions described above as being performed in or by the vehicle 102 may be performed using any suitable hardware or any suitable combination of hardware and software/firmware instructions. Any suitable hardware may also be used here, such as one or more microprocessors, microcontrollers, DSPs, ASICs, FPGAs, or discrete circuitry. Also note that while specific mathematical equations are provided above, these equations relate to specific implementations of various operations described above and do not limit the scope of this disclosure to those specific equations.

The following describes example embodiments of this disclosure that implement or relate to the conversion of computer vision data into measurements for an in-vehicle ADAS or other system. However, other embodiments may be used in accordance with the teachings of this disclosure.

In a first embodiment, a method includes obtaining an image of a scene using an imaging sensor on a vehicle, where the image captures at least one of: one or more objects around the vehicle or one or more lane marking lines. The method also includes identifying extrinsic calibration parameters associated with the imaging sensor. The method further includes, for a specified pixel in the image, converting a position of the specified pixel within a pixel coordinate system associated with the image to a corresponding position within a road coordinate system based on the extrinsic calibration parameters. The specified pixel represents a point in the image associated with at least one of the one or more objects or the one or more lane marking lines. In addition, the method includes identifying a distance to the point in the image based on the corresponding position of the specified pixel within the road coordinate system.

Any single one or any suitable combination of the following features may be used with the first embodiment. The distance may represent a distance between a specified point associated with the vehicle and the corresponding position of the specified pixel within the road coordinate system. The specified point associated with the vehicle may represent a center point of a front bumper of the vehicle at ground level, and the specified point may lie within a plane of a surface on which the vehicle is moving. The extrinsic calibration parameters may include multiple translational offsets and multiple rotational offsets associated with the imaging sensor. The position of the specified pixel within the pixel coordinate system may be converted to the corresponding position within the road coordinate system based on (i) an assumption that the imaging sensor is a pinhole camera and (ii) a conversion between a camera coordinate system and the pixel coordinate system that depends on multiple intrinsic calibration parameters associated with the imaging sensor. The multiple intrinsic calibration parameters associated with the imaging sensor may include one or more focal lengths associated with the imaging sensor and multiple distances identifying a position of the imaging sensor relative to a center of a pinhole lens. A specified one of the one or more objects may be associated with a bounding box defined around the specified object, and the specified pixel may be associated with a center of a bottom edge of the bounding box such that the distance represents a distance from the vehicle to the specified object. The position of the specified pixel within the pixel coordinate system may be converted to the corresponding position within the road coordinate system using formulas of:

$$X = \frac{(\alpha T_y - \beta T_x)\cos R_x \cos R_y + (T_x - \alpha T_z)\sin R_x \cos R_y + (T_y - \beta T_z)\sin R_y}{\beta \cos R_x - \sin R_x}$$

$$Z = \frac{(T_y - \beta T_z)\cos R_y + (\beta T_x - \alpha T_y)\cos R_x \sin R_y + (-T_x + \alpha T_z)\sin R_x \sin R_y}{\beta \cos R_x - \sin R_x}$$

where X and Z represent coordinates of the corresponding position within the road coordinate system;

$$\alpha = \frac{u - c_x}{f}; \beta = \frac{v - c_y}{f};$$

u and v represent coordinates of the specified pixel within the pixel coordinate system; f represents a focal length associated with the imaging sensor; $c_x$ and $c_y$ represent distances identifying a position of the imaging sensor relative to a center of a pinhole lens; $T_x$, $T_y$ and $T_z$ represent translational offsets associated with the imaging sensor; and $R_x$ and $R_y$ represent rotational offsets associated with the imaging sensor. An operation of the vehicle may be controlled based on the distance. Positions of multiple pixels within the pixel coordinate system may be converted to multiple corresponding positions within the road coordinate system, the multiple pixels may be associated with at least one of the one or more lane marking lines, at least one polynomial may be fit to the corresponding positions within the road coordinate system, and each polynomial may identify a path of one of the one or more lane marking lines. Multiple polynomials may be fit to the corresponding positions within the road coordinate system in order to identify paths of two lane marking lines, a lane in which the vehicle is traveling may be defined by the two lane marking lines, a specified one of the one or more objects may be associated with a bounding box defined around the specified object, the specified pixel in the image may be positioned on the bounding box, and a determination can be made whether the specified object is located within the lane by determining whether the corresponding position of the specified point lies between the polynomials within the road coordinate system. A polynomial may be fit to the corresponding positions within the road coordinate system in order to identify a path of one lane marking line, a lane in which the vehicle is traveling may be partially defined by the one lane marking line, a specified one of the one or more objects may be associated with a bounding box defined around the specified object, the specified pixel in the image may be positioned on the bounding box, and a determination can be made whether the specified object is located within the lane based on the bounding box and the polynomial and assuming the lane is straight. For each polynomial, a closest point of the polynomial to the vehicle may be identified, a straight line leading to the closest point of the polynomial may be identified, the straight line may have a slope that matches a tangent of the polynomial at the closest point, and a lateral distance to the straight line within the road coordinate system may be estimated. For each polynomial, the lateral distance to the straight line within the road coordinate system may be estimated by estimating a first lateral distance within the road coordinate system from a specified point associated with the vehicle to the straight line and estimating a second lateral distance within the road coordinate system from a side of the vehicle to the straight line based on the first lateral distance. At least one action may be triggered in response to determining that the vehicle is approaching, is crossing, or has crossed one of the one or more lane marking lines.

In a second embodiment, a method includes obtaining an image of a scene using an imaging sensor on a vehicle, where the image captures an object and one or more lane marking lines. The method also includes converting positions of multiple pixels within a pixel coordinate system associated with the image to multiple corresponding positions within a road coordinate system. The multiple pixels are associated with the object and the one or more lane marking lines. The method further includes fitting at least one polynomial to the corresponding positions within the road coordinate system associated with the one or more lane marking lines. Each polynomial identifies a path of one of the one or more lane marking lines. In addition, the method includes determining whether the object is located within a lane in which the vehicle is traveling, where the lane is at least partially defined by the at least one polynomial.

Any single one or any suitable combination of the following features may be used with the second embodiment. Multiple polynomials may be fit to the corresponding positions within the road coordinate system in order to identify paths of two lane marking lines, the lane may be defined by the two lane marking lines, the object may be associated with a bounding box defined around the object, and the determination of whether the object is located within the lane may include determining whether a corresponding position of a specified point in the image on the bounding box lies between the polynomials within the road coordinate system. A polynomial may be fit to the corresponding positions within the road coordinate system in order to identify a path of one lane marking line, the lane may be partially defined by the one lane marking line, the object may be associated with a bounding box defined around the object, and the determination of whether the object is located within the lane may include determining whether the object is located within the lane based on the bounding box and the polynomial and assuming the lane is straight. The at least one polynomial may include one or more second-order polynomials. An operation of the vehicle may be controlled based on a determination that the object is located within the lane.

In a third embodiment, a method includes obtaining an image of a scene using an imaging sensor on a vehicle, where the image captures one or more lane marking lines. The method also includes converting positions of multiple pixels within a pixel coordinate system associated with the image to multiple corresponding positions within a road coordinate system. The multiple pixels are associated with the one or more lane marking lines. The method further includes fitting at least one polynomial to the corresponding positions within the road coordinate system associated with the one or more lane marking lines. Each polynomial identifies a path of one of the one or more lane marking lines. The method also includes extrapolating a path of a non-visible portion of each of the one or more lane marking lines based on the at least one polynomial. In addition, the method includes estimating a lateral distance of the vehicle to the path of the non-visible portion of each of the one or more lane marking lines.

Any single one or any suitable combination of the following features may be used with the third embodiment. The path of the non-visible portion of each of the one or more lane marking lines may be extrapolated by, for each polynomial, identifying a closest point of the polynomial to the vehicle and identifying a straight line leading to the closest point of the polynomial (where the straight line may represent the path of the non-visible portion of the associated lane marking line and may have a slope that matches a tangent of the polynomial at the closest point). The lateral distance of the vehicle to the path of the non-visible portion of each of the one or more lane marking lines may be estimated by, for each polynomial, estimating a first lateral distance within the road coordinate system from a specified point associated with the vehicle to the straight line and estimating a second lateral distance within the road coordinate system from a side of the vehicle to the straight line based on the first lateral distance. The at least one polynomial may include one or more second-order polynomials. At least one action may be triggered in response to determining that the vehicle is approaching, is crossing, or has crossed one of the one or more lane marking lines.

In other embodiments, an apparatus includes at least one processing device configured to perform the method of one, some, or all of the first, second, and third embodiments (and optionally for any one or any combination of the features mentioned above with respect to the first, second, and third embodiments). In still other embodiments, a non-transitory machine-readable medium contains instructions that when executed cause at least one processor to perform the method of one, some, or all of the first, second, and third embodiments (and optionally for any one or any combination of the features mentioned above with respect to the first, second, and third embodiments).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
  obtaining an image of a scene using an imaging sensor on a vehicle, the image capturing at least one of: one or more objects around the vehicle or one or more lane marking lines;
  identifying extrinsic calibration parameters associated with the imaging sensor;
  for a specified pixel in the image, converting a position of the specified pixel within a pixel coordinate system associated with the image to a corresponding position within a road coordinate system based on the extrinsic calibration parameters, the specified pixel representing a point in the image associated with at least one of the one or more objects or the one or more lane marking lines; and identifying a distance to the point in the image based on the corresponding position of the specified pixel within the road coordinate system;

wherein converting the position of the specified pixel within the pixel coordinate system to the corresponding position within the road coordinate system comprises using a position of the imaging sensor relative to a center of a pinhole lens.

2. The method of claim 1, wherein the distance represents a distance between a specified point associated with the vehicle and the corresponding position of the specified pixel within the road coordinate system.

3. The method of claim 2, wherein:

the specified point associated with the vehicle represents a center point of a front bumper of the vehicle at ground level; and the specified point lies within a plane of a surface on which the vehicle is moving.

4. The method of claim 1, wherein the extrinsic calibration parameters comprise multiple translational offsets and comprise multiple rotational offsets associated with the imaging sensor.

5. The method of claim 1, wherein converting the position of the specified pixel within the pixel coordinate system to the corresponding position within the road coordinate system is based on (i) an assumption that the imaging sensor is a pinhole camera and (ii) a conversion between a camera coordinate system and the pixel coordinate system that depends on multiple intrinsic calibration parameters associated with the imaging sensor.

6. The method of claim 5, wherein the multiple intrinsic calibration parameters associated with the imaging sensor comprise:

one or more focal lengths associated with the imaging sensor; and multiple distances identifying the position of the imaging sensor relative to the center of the pinhole lens.

7. The method of claim 1, wherein:

a specified one of the one or more objects is associated with a bounding box defined around the specified object; and the specified pixel is associated with a center of a bottom edge of the bounding box such that the distance represents a distance from the vehicle to the specified object.

8. The method of claim 1, wherein converting the position of the specified pixel within the pixel coordinate system to the corresponding position within the road coordinate system comprises using formulas of:

$$X = \frac{(\alpha T_y - \beta T_x)\cos R_x \cos R_y + (T_x - \alpha T_z)\sin R_x \cos R_y + (T_y - \beta T_z)\sin R_y}{\beta \cos R_x - \sin R_x}$$

$$Z = \frac{(T_y - \beta T_z)\cos R_y + (\beta T_x - \alpha T_y)\cos R_x \sin R_y + (-T_x + \alpha T_z)\sin R_x \sin R_y}{\beta \cos R_x - \sin R_x}$$

where:

X and Z represent coordinates of the corresponding position within the road coordinate system;

$$\alpha = \frac{u - c_x}{f};$$

$$\beta = \frac{v - c_y}{f};$$

u and v represent coordinates of the specified pixel within the pixel coordinate system;

f represents a focal length associated with the imaging sensor;

$c_x$ and $c_y$ represent distances identifying the position of the imaging sensor relative to the center of the pinhole lens;

$T_x$, $T_y$, and $T_z$ represent translational offsets associated with the imaging sensor; and $R_x$ and $R_y$ represent rotational offsets associated with the imaging sensor.

9. The method of claim 1, further comprising:

controlling operation of the vehicle based on the distance.

10. The method of claim 1, further comprising:

converting positions of multiple pixels within the pixel coordinate system to multiple corresponding positions within the road coordinate system, the multiple pixels associated with at least one of the one or more lane marking lines; and fitting at least one polynomial to the corresponding positions within the road coordinate system, each polynomial identifying a path of one of the one or more lane marking lines.

11. The method of claim 10, wherein:

multiple polynomials are fit to the corresponding positions within the road coordinate system in order to identify paths of two lane marking lines, a lane in which the vehicle is traveling defined by the two lane marking lines;

a specified one of the one or more objects is associated with a bounding box defined around the specified object, the specified pixel in the image positioned on the bounding box; and the method further comprises determining whether the specified object is located within the lane by determining whether the corresponding position of the specified point lies between the polynomials within the road coordinate system.

12. The method of claim 10, wherein:

a polynomial is fit to the corresponding positions within the road coordinate system in order to identify a path of one lane marking line, a lane in which the vehicle is traveling partially defined by the one lane marking line;

a specified one of the one or more objects is associated with a bounding box defined around the specified object, the specified pixel in the image positioned on the bounding box; and the method further comprises determining whether the specified object is located within the lane based on the bounding box and the polynomial and assuming the lane is straight.

13. The method of claim 10, further comprising, for each polynomial:

identifying a closest point of the polynomial to the vehicle;

identifying a straight line leading to the closest point of the polynomial, the straight line having a slope that matches a tangent of the polynomial at the closest point; and estimating a lateral distance to the straight line within the road coordinate system.

14. The method of claim 13, wherein, for each polynomial, estimating the lateral distance to the straight line within the road coordinate system comprises:

estimating a first lateral distance within the road coordinate system from a specified point associated with the vehicle to the straight line; and estimating a second lateral distance within the road coordinate system from a side of the vehicle to the straight line based on the first lateral distance.

15. The method of claim 13, further comprising:

triggering at least one action in response to determining that the vehicle is approaching, is crossing, or has crossed one of the one or more lane marking lines.

16. A method comprising:

obtaining an image of a scene using an imaging sensor on a vehicle, the image capturing an object and one or more lane marking lines;

converting positions of multiple pixels within a pixel coordinate system associated with the image to multiple corresponding positions within a road coordinate system, the multiple pixels associated with the object and the one or more lane marking lines;

fitting at least one polynomial to the corresponding positions within the road coordinate system associated with the one or more lane marking lines, each polynomial identifying a path of one of the one or more lane marking lines; and determining whether the object is located within a lane in which the vehicle is traveling, the lane at least partially defined by the at least one polynomial;

wherein converting the positions of the pixels within the pixel coordinate system to the corresponding positions within the road coordinate system comprises using a position of the imaging sensor relative to a center of a pinhole lens.

17. The method of claim 16, wherein:

multiple polynomials are fit to the corresponding positions within the road coordinate system in order to identify paths of two lane marking lines, the lane defined by the two lane marking lines;

the object is associated with a bounding box defined around the object; and determining whether the object is located within the lane comprises determining whether a corresponding position of a specified point in the image on the bounding box lies between the polynomials within the road coordinate system.

18. The method of claim 16, wherein:

a polynomial is fit to the corresponding positions within the road coordinate system in order to identify a path of one lane marking line, the lane partially defined by the one lane marking line;

the object is associated with a bounding box defined around the object; and determining whether the object is located within the lane comprises determining whether the object is located within the lane based on the bounding box and the polynomial and assuming the lane is straight.

19. The method of claim 16, wherein the at least one polynomial comprises one or more second-order polynomials.

20. The method of claim 16, further comprising:

controlling operation of the vehicle based on a determination that the object is located within the lane.

21. A method comprising:

obtaining an image of a scene using an imaging sensor on a vehicle, the image capturing one or more lane marking lines;

converting positions of multiple pixels within a pixel coordinate system associated with the image to multiple corresponding positions within a road coordinate system, the multiple pixels associated with the one or more lane marking lines;

fitting at least one polynomial to the corresponding positions within the road coordinate system associated with the one or more lane marking lines, each polynomial identifying a path of one of the one or more lane marking lines;

extrapolating a path of a non-visible portion of each of the one or more lane marking lines based on the at least one polynomial; and estimating a lateral distance of the vehicle to the path of the non-visible portion of each of the one or more lane marking lines;

wherein converting the positions of the pixels within the pixel coordinate system to the corresponding positions within the road coordinate system comprises using a position of the imaging sensor relative to a center of a pinhole lens.

22. The method of claim 21, wherein extrapolating the path of the non-visible portion of each of the one or more lane marking lines comprises, for each polynomial:

identifying a closest point of the polynomial to the vehicle; and identifying a straight line leading to the closest point of the polynomial, the straight line representing the path of the non-visible portion of the associated lane marking line and having a slope that matches a tangent of the polynomial at the closest point.

23. The method of claim 22, wherein estimating the lateral distance of the vehicle to the path of the non-visible portion of each of the one or more lane marking lines comprises, for each polynomial:

estimating a first lateral distance within the road coordinate system from a specified point associated with the vehicle to the straight line; and estimating a second lateral distance within the road coordinate system from a side of the vehicle to the straight line based on the first lateral distance.

24. The method of claim 21, wherein the at least one polynomial comprises one or more second-order polynomials.

25. The method of claim 21, further comprising:

triggering at least one action in response to determining that the vehicle is approaching, is crossing, or has crossed one of the one or more lane marking lines.

26. The method of claim 1, wherein converting the position of the specified pixel within the pixel coordinate system to the corresponding position within the road coordinate system comprises using (i) the position of the imaging sensor relative to the center of the pinhole lens, (ii) at least one focal length associated with the imaging sensor, (iii)

multiple translational offsets associated with the imaging sensor, and (iv) multiple rotational offsets associated with the imaging sensor.

\* \* \* \* \*